United States Patent [19]
Gardner et al.

[11] Patent Number: 5,691,984
[45] Date of Patent: Nov. 25, 1997

[54] COMPACT, ADAPTABLE BROUTING SWITCH

[75] Inventors: Gary A. Gardner, Clearwater; Stephen E. Belvin, Largo, both of Fla.

[73] Assignee: Honeywell Inc., Minneapolis, Minn.

[21] Appl. No.: 515,416

[22] Filed: Aug. 15, 1995

[51] Int. Cl.$^6$ .................................................. H04L 12/66

[52] U.S. Cl. ........................ 370/401; 370/466; 370/471

[58] Field of Search ..................... 370/60, 60.1, 85.9, 370/85.13, 85.14, 94.1, 94.2, 401–405, 465, 466, 470, 471

[56] References Cited

U.S. PATENT DOCUMENTS 5,060,228  10/1991  Tsutsui et al. ...................... 370/85.13
5,515,376  5/1996  Murthy et al. ...................... 370/94.1

*Primary Examiner*—Melvin Marcelo
*Attorney, Agent, or Firm*—Thomas A. Rendos; Albert K. Kau; Vincent A. Branton

[57] ABSTRACT

The compact brouting switch allows communication between external systems with differing or same protocols. The compact brouting switch includes switch ports which receive and transfer data between the external systems. A processor in the switch controls the movement of data within the switch and assigns data to specific switch ports to transfer data to specific external systems. However, the switch ports also have the capability of directly transferring data from one external system to another external system bypassing the processor.

10 Claims, 29 Drawing Sheets

Figure 5

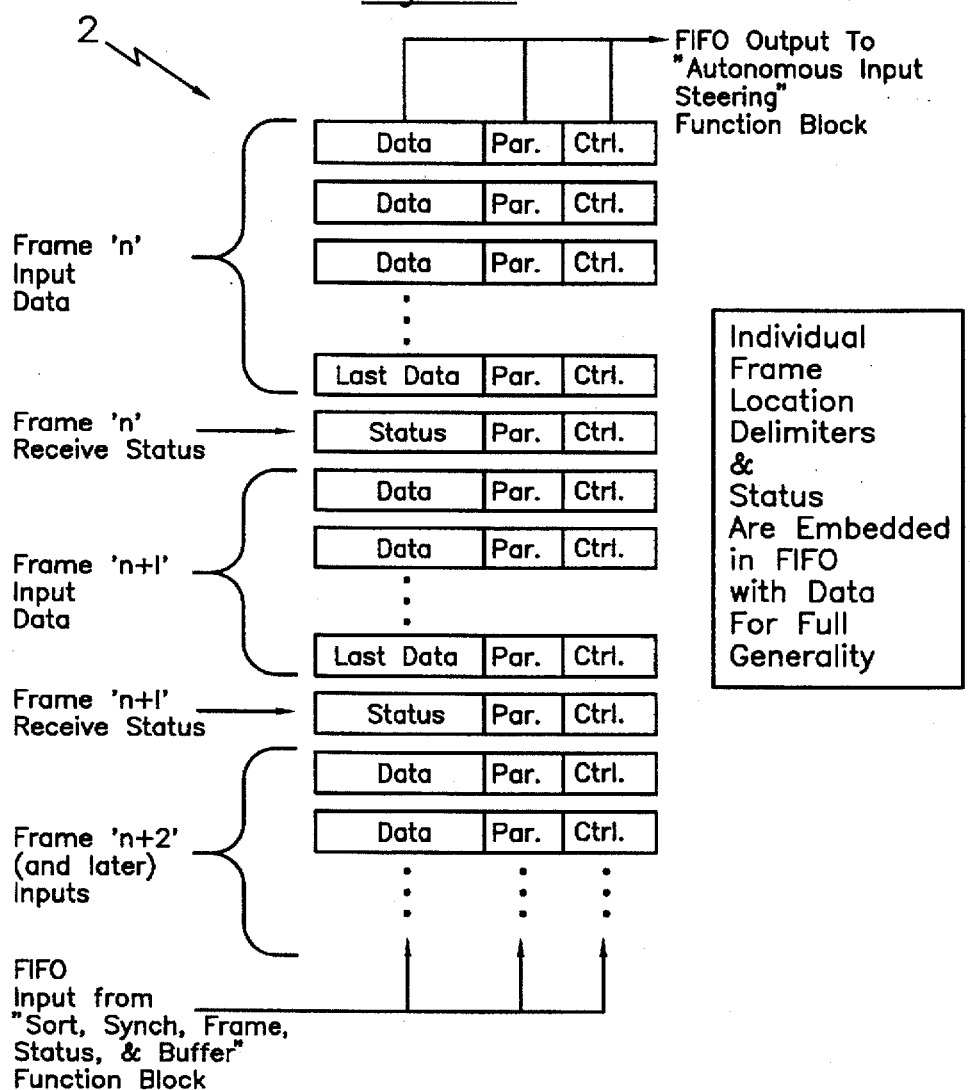

FIFO Contents Definition:

Data = 32 Bit Words

Par. = 2 Parity Bits
(2x16 Bit Parity)
(Odd parity for Last Data and Status)
(Even parity for other Data)

Ctrl. = 1 Control Bit for Framing
('1' for Last Data and Status FIFO Entries for a Frame)
('0' for other Data Entries)

Status = 32 Bit Word ==
(17 Bit FrameLength [in Bytes])
(1 Bit Dynamic Frame Type)
(4 Bits External I/F Error Count)
(1 Bit Max. Frame Size Indicator)
(1 Bit FIFO Overrun Indicator)
(1 Bit FIFO Parity Error∗)

∗Filled in at FIFO Read

Case 1 Return

Case 2 Return

COMPACT, ADAPTABLE BROUTING SWITCH

BACKGROUND OF THE INVENTION

Interconnecting stations for the purpose of communications is well known in the prior art. Point-to-point connections have been used for many years. This concept has also been extended to involve two or more stations operating in a small geographical area to form a Local Area Network (LAN). A typical LAN involves the use of one protocol and a shared interconnection media. The need to extend LANs beyond the physical limitations under which they operate is one reason for the growing interest in communications devices that interconnect LANs. Another reason is the need to communicate between LANs employing different physical interfaces and link protocols. Devices called "bridges", "routers" or "gateways" are used to provide communications between LANs.

Stations communicate using protocol data units or frames which consist of data and routing information. It often includes logical identification of the source and destination stations, as well as information about the length of the data frame. The contents of the routing information depends on the protocol of the link. In order to interconnect LANs of different protocols, data frames must be translated before being sent out to a port towards its destination. In the case of two LANs having the same link protocols, no translation is necessary. A device that can perform the necessary translation (if any) which is appropriate based on the input port (static bridging or routing) or information provided in the data frame (dynamic bridging or routing) is called a "bridge/router", or "brouter".

Circuit switching was used for many years as one transfer mode involving relays to establish dedicated circuits between source and destination for the entire duration of communication. The concept of frame switching helped promote the use of LANs by eliminating the need for synchronous switching. Frame switching uses the additional information provided in the header to route data to the destination port or ports. In general, output ports are not dedicated to an input port but may be used with data from any input port. Frame switching performs a virtual circuit connection between input port and output port which is asynchronous to the data rate of either port. A group of elements used to store and transport a frame from the input port to one or more output ports is called the "switch fabric". As the part of the switch fabric where data enters and exits, input and output ports are called "switch ports".

The physical interface of a port assists in delivering data into or out of the switch system using electrical signals. The characteristics of the physical interface depend on the protocol of the link to which they are connected. One characteristic of a port is the method used to capture data. For example, data may be supplied along with a separate clock signal or the data clock may be present in the data signal through the use of coding techniques. The physical interface may also provide additional signals to assist in recognizing data frames. While the physical characteristics of some ports may allow them to support several closely related interfaces, radically different link protocols result in the use of different processing facilities for the recognition of a data frame. An example of radically different link protocols is one with framing information in the data stream and another with separate data framing signals on the interface.

Once a data frame has been recognized and received, it must be processed by the system. The processing often involves the use of a processor dedicated to a port and programmed specifically for transferring a data frame into memory. The processor may also perform the processing required to translate data frames as they arrive. The result is many processing elements distributed throughout the switch fabric. Since the processing elements are distributed across many ports, no common data buffering structure is present. A data frame may be transferred several times between several data buffering structures before it is processed for output. Then the output frame may be transferred several more times before arriving at the output port.

These distributed processing brouter switch systems work well at transferring data but are complex in terms of configuration and maintenance. In addition to unnecessary complexity, users are also burdened with the size, weight and power required by these systems. Therefore, it would be beneficial to reduce the size, weight and power required by the present systems while still meeting brouting switch latency and throughput requirements.

SUMMARY OF THE INVENTION

The present invention is a compact brouting switch which allows communication between multiple external systems of similar and different protocols. The switch includes switch ports, a central memory, a bus, and a processor. The switch ports receive and transfer data with external systems. The central memory device is connected to all the switch ports and stores communication management information. The bus connects the switch ports with the central memory and transfers the communication management information between the switch ports, and between the switch ports and the central memory. The processor is connected to the central memory and controls the movement of data within the compact brouting switch.

BRIEF DESCRIPTION OF THE DRAWINGS

FIG. 5 shows a function block diagram of the temporal buffering of data frames and their associated status information in a first-in, first-out data queue with data/status boundary markers.

DESCRIPTION OF THE PREFERRED EMBODIMENT

The present invention is used to interconnect communications devices and networks employing a wide variety of protocols using a central control mechanism. It works well for both point-to-point communications and for interconnecting any type of local area network. For the purposes of the description that follows, three closely related link protocols have been used. However, the use of this invention is not limited to these link protocols. Those skilled in the art may choose other link protocols that may include the technologies of the IEEE Standard 802 series. For the purposes of the description that follows, data is transported in such a way as to form units consisting either entirely of data or of data and control information. The description that follows uses the term "frame" to represent a unit of information. Alternative data unit terminology includes but is not limited to packet or cell. As used herein after, "brouting switch" means the different types of devices used to interconnect communications networks, including but not limited to, bridges, routers and gateways.

Figure 1:
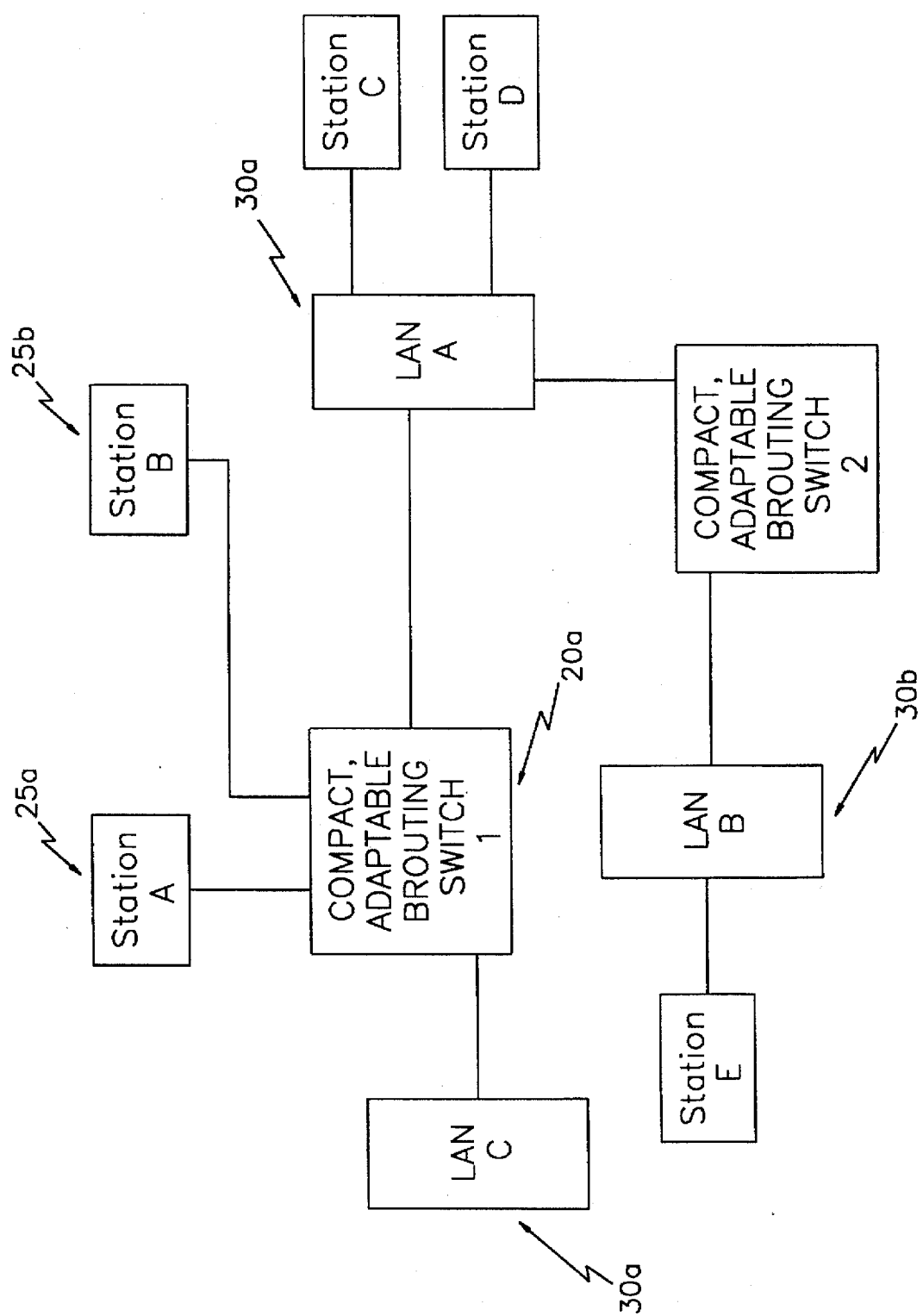
FIG. 1 shows a block diagram of the Compact Adaptable Brouting (CAB) switch embodying the teachings of the present invention.

The invention is used to interconnect devices for the purposes of communication of information as seen in FIG. 1. FIG. 1 shows the brouting switch system 20a in accordance with the present invention being used in both point-to-point and local area network configurations. The invention allows devices such as Station A 25a and Station B 25b whose link protocols may be the same or may be different to communicate with one another. The brouting switch system 20a is also used to allow Local Area Networks (LANs) represented by LAN A 30a, LAN B 30b and LAN C 30c to communicate even though their link protocols may be different. Another use of the brouting switch system 20a is to connect devices to LANs for data communications or for multiple LAN management from a central point, such as Station A 25a or Station B 25b being used for management of one or more of the LANs (LAN A, LAN B and/or LAN C) 30. It should be noted that the block diagram shown in FIG. 1 is only exemplary and should not be construed as a limitation of the scope of the present invention. Station A 25a could communicate to LAN A 30a across Brouting Switch System 1 20a using one of the many possible link protocols supported. The Brouting Switch System 1 20a translates the data frame received from Station A 25a to network and link protocols supported by LAN A 30a and forwards the data onto LAN 30a. This translation is performed autonomously based on previously configured information.

Figure 2:
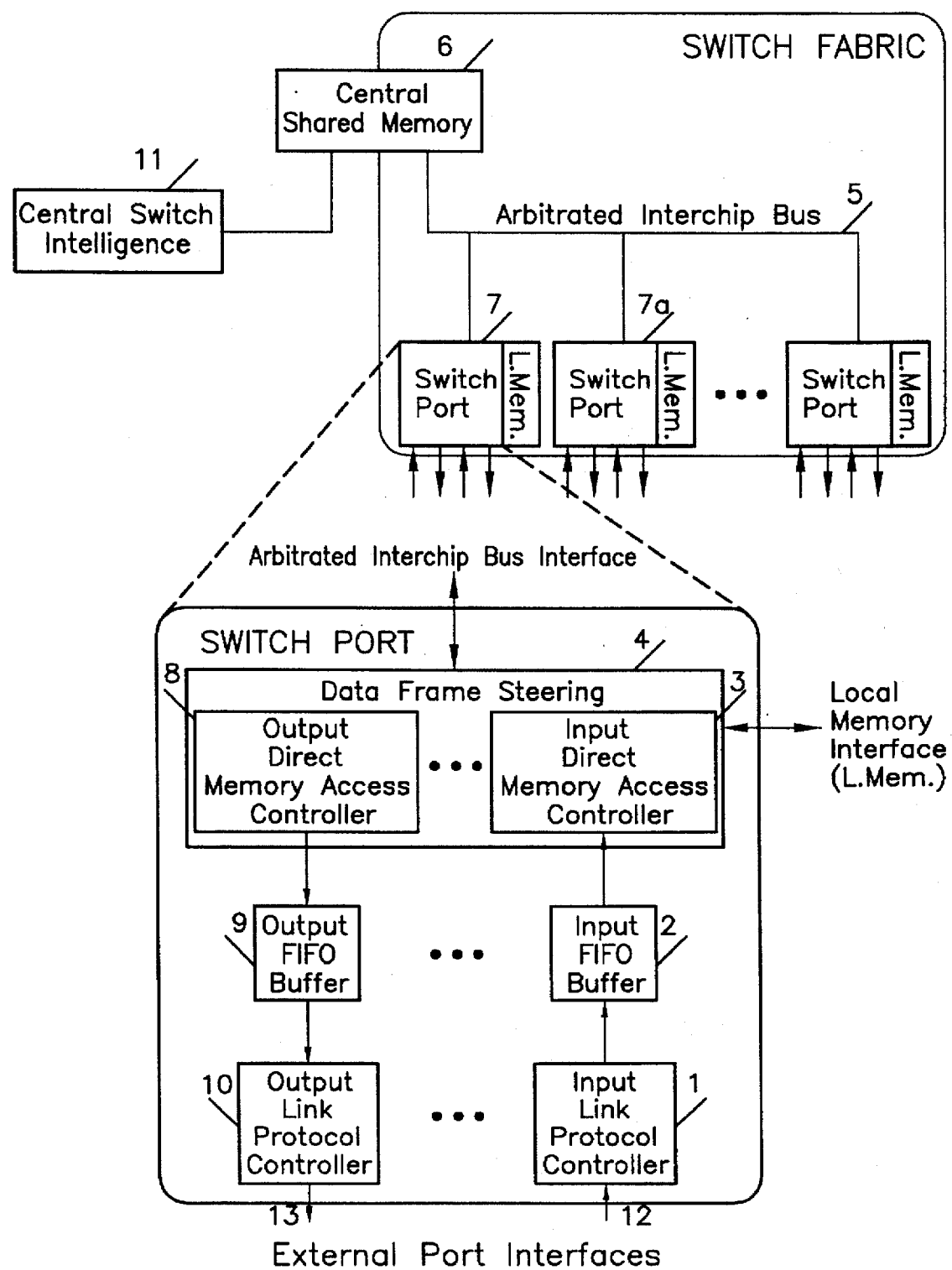
FIG. 2 shows a functional block diagram of the CAB switch according to the teachings of the present invention.

FIG. 2 shows a block diagram of an architecture of the Compact Adaptable Brouting (CAB) switch system. The system includes a central shared memory (CSM) 6, a plurality of switch ports 7 each with an individual local memory 7a, an arbitrated interchip bus (AIB) 5 and a central switch intelligence 11, a processor. A plurality of external ports 12 and 13, part of the switch ports 7, are used to interconnect communication devices and communicate with these external devices. The external ports 12 and 13 are capable of supporting many link control and data signal configurations. Data buffering in the form of input shift registers and data rate absorption first-in, first-out (FIFO) buffers allows for dock rate differences between the external interfaces and the Central Switch Intelligence 11. All of the switch ports 7 are connected together using the AIB 5.

Communication in the system 20a occurs by transferring data frames. Data frames are placed into and removed from data frame queues stored in memory 6 using the AIB 5. Data frames may also be transferred either directly to an output port 13 or to local memory 7a without involving the use of the AIB 5 using resources within the Data Frame Steering block 4. The data frame steering block 4 includes paths, such as logic paths, in which data is transferred. The Central Switch Intelligence (CSI) 11 is used to configure the switch port 7 for the link protocol to be used and the source or destination of data transfer which passes through the switch port 7. This information is unique to, and therefore stored by, each external port of the switch port 7. The physical link protocol of the output port 13 need not be the same as the input port 12 from which the data frame arrived. If they are different, frame processing is required by the CSI 11. Management of the Compact, Adaptable Brouting Switch 20a activity is also performed by the CSI 11 using external port configuration information and data transfer control information.

The central shared memory 6, along with the frame transfer, buffering and protocol support functions, form the switch fabric 14 identified by the shaded area of FIG. 2. Data frames are input, possibly altered through frame processing and directed to one or more output ports 13 using the data transfer and storage features of the switch fabric 14.

The switch ports 7 are compatible with external systems of differing protocols, differing header formats and datalinks. The switch ports 7 each have two inputs and two outputs. This allows the switch ports 7 to individually take data and relate it to the appropriate ports. This helps the central switch intelligence 11 from being overloaded. The switch ports 7 have a multiple number of operations that they perform individually to allow the system 20a to operate more efficiently.

Data from an external device is received by the switch port 7. The switch port 7 has the capability to autonomously move the incoming either to its appropriate memory buffer or directly to an output port FIFO 9. When the switch port 7 receives data from an external source, a data queue pointer list in the central shared memory 6 is accessed and moves the data packet to the correct queue and queue location. The switch port 7 also has the capability to move the data packet into a local memory 7a. Therefore, time is saved in not interrupting the central switch intelligence 11 to put time aside and perform this operation in determining which stack to process. This allows the central switch intelligence 11 to operate at its own schedule without being interrupted. The switch ports 7 are dynamic in that they automatically put data in the respective buffers in the central shared memory 6 or local memory 7a. They perform multiple frame transfers and assist with their own buffer management. Also, the operations include a status of the movement of the data, whether it is input or output, to the central switch intelligence 11 in the form of mail to a mailbox in the central shared memory 6.

Figure 3:
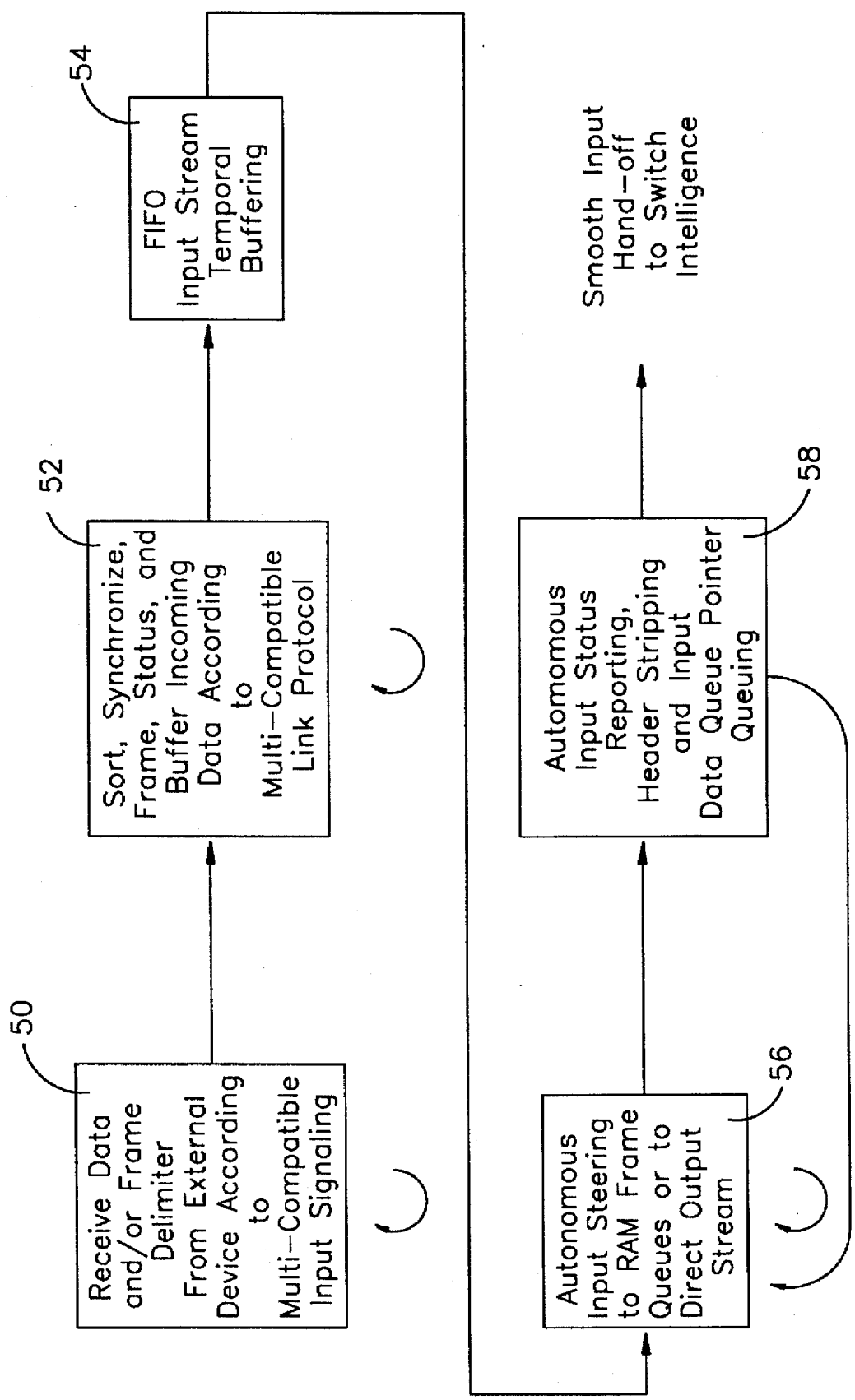
FIG. 3 shows a flow chart of the data input process control detailed further in the embodiment of FIG. 4A sequentially up to and including FIG. 7.

Data frames are input to the brouting switch system 20 through a port 7 and processed according to the flow chart shown in FIG. 3. The input port 12 operates as a pipeline such that, at any given time, there is likely to simultaneously be data in each of the operational stages depicted by FIG. 3. Each external port 12 may support different link protocols or may be configured for the same link protocol. Data frames are identified, buffered and transferred to their destination. For all the input link protocols, the input data frame status records the occurrence of particular events during the reception of the data frame with which it is associated. At the end of the data frame, status is stored in the same path as data and the indicators are returned to their default states. Data frames may be transferred either to memory or directly to an output port.

The first block 50 just accepts the data coming into the input of the switch port 12. Width of the physical data frame path is configurable and allowed to vary. Each port 12 may support different link protocols or may be configured for the same link protocol.

The second block 52 determines the frames. This is achieved by first synchronizing and then sorting real data from idle data which may exist between data frames. Data is buffered and transferred to its destination while the link protocol indicates a frame is being received. For all the input link protocols, the input data frame status records the occurrence of particular events during the reception of the data frame with which it is associated. Then the frame is marked to indicate the beginning and the end of the frame. At the end of the data frame, status is stored in the same path as data and the indicators are returned to their default states. Along with size and type, this status indicates whether the frame is good or bad. For example, a frame is considered "bad" if the frame is shorter in length compared to what it should be in a fixed frame format. Another example, is if the frame is infinite, then the frame must be cut off after some point and is considered "bad."

The third block 54 shows the frames being stored in the buffer 2. Buffering is defined as holding onto a frame until it is stored in the memory.

Data frames may be transferred either to local memory 7a or directly to an output port or to the CSM 6 as shown in block four 56. This step is performed without the need of the central switch intelligence 11. This step is performed by differing modes which will be discussed later. Again previously, a processor was required for frame transfers, but the present invention frees up the processor (CSI) 11 by performing this task without the processor. The last block stores the pointer in a control file at the CSM 6 without the need of the CSI 11.

Figure 4A:
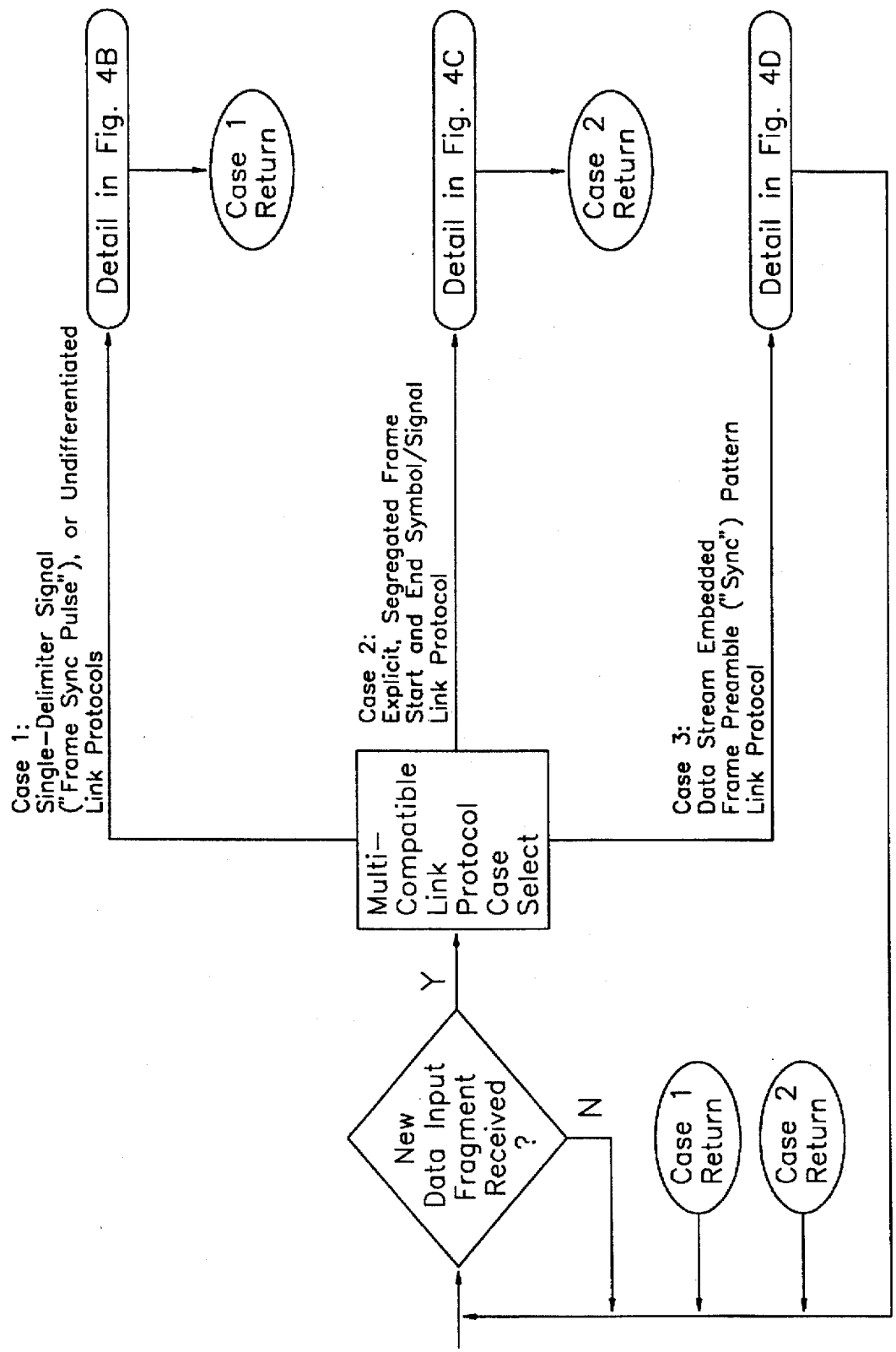
FIG. 4A shows a flow chart of the control used to select the identification and buffering of an input data frame based on the link protocol.

FIG. 4A shows a flow chart of three possible link protocols, one of which has been selected for use on an input data stream by the CSI 11. Three types of protocol are used with the present invention: Single Delimiter Signal Link Protocol, Start and End Symbol/Signal Link Protocol, and Frame Preamble Pattern Link Protocol. All data frames are input to the CAB switch 20a using one of the available external input ports 12. Switch Ports 7 may be configured for various data widths and data transfer control signaling. Data and possibly framing control information are used to perform both bit-level and frame-level synchronization. Even though the present invention has been described to operate synchronously, the present embodiment is not limited to such operation. The present embodiment may operate asynchronously as well as synchronously.

Figure 4B:
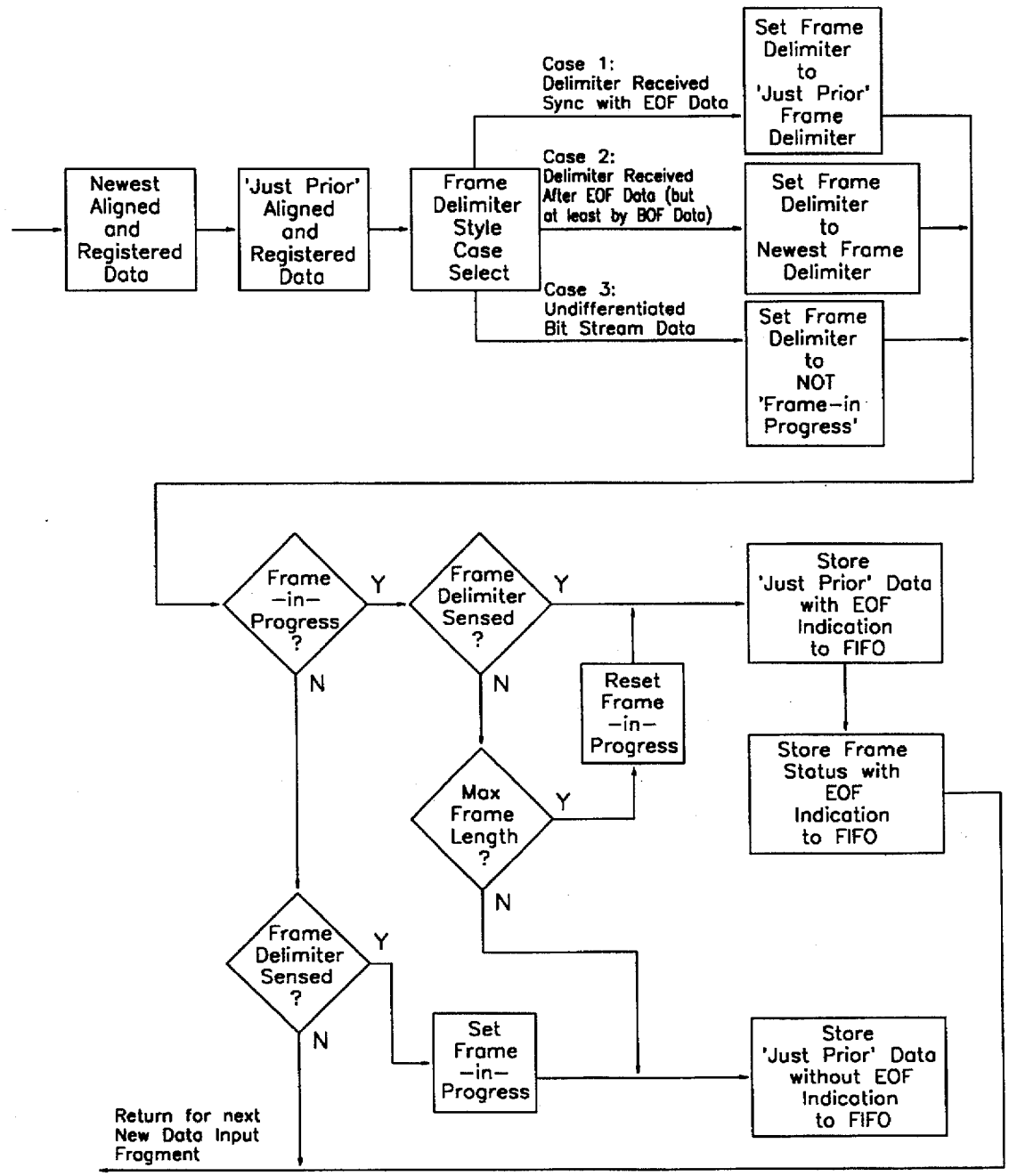
FIG. 4B shows a flow chart for identification and buffering an input data frame using a single-delimiter or an undifferentiated link protocol.

FIG. 4B shows a flow chart of the processing that occurs if the link protocol is such that data frame boundaries are identified by a single separate signal indicating the boundary of a frame (referred to here as a single-delimiter signal link protocol). A frame boundary may occur by either a beginning of frame (BOF) indication or an end of frame (EOF) indication. A delay is introduced to the switch port pipeline when using an EOF indication to allow time to process the end a frame and begin a new one. This delay is represented by the use of 'Just Prior' frame delimiter information. A data frame may also end by reaching the maximum length count configured by the CSI 11. With the use of the frame length counter, this protocol supports fixed frame sizes separated by insignificant link activity with the use of a BOF indication. The processing shown by the flow chart in FIG. 4B also occurs if the data frames are not uniquely identified by either switch port 7 signal or patterns in data, but by counting the number of inputs (referred to as an undifferentiated link protocol). If a frame is not in progress, a new frame is begun. A frame ends by reaching the terminal input count configured by the CSI 11.

Figure 4C:
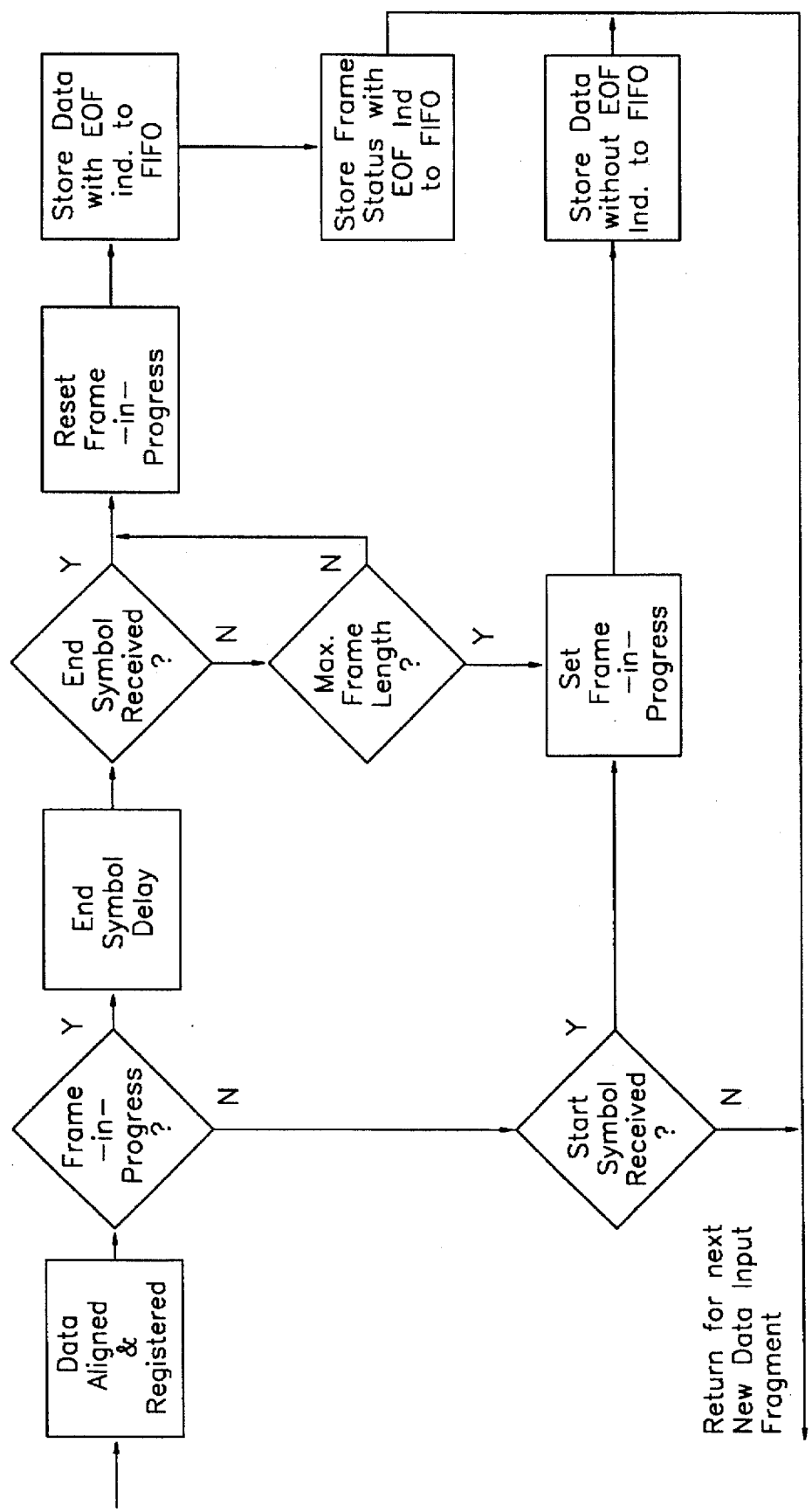
FIG. 4C shows a flow chart for identification and buffering an input data frame using an explicit start and end symbol/signal link protocol.

FIG. 4C shows a flow chart of the processing that occurs if the link protocol used bounds the frame at the start and end using external signals. The data frame is bound using a parallel or mutually exclusive control symbol or signal path. Data frames begin with the explicit start-of-frame symbol sequence or signal indication. The end of a data frame occurs either by the occurrence of an explicit end-of-frame symbol sequence or signal indication. The end of a data frame may also occur if the number of input bytes equals the maximum data frame size configured by the CSI 11.

Figure 4D:
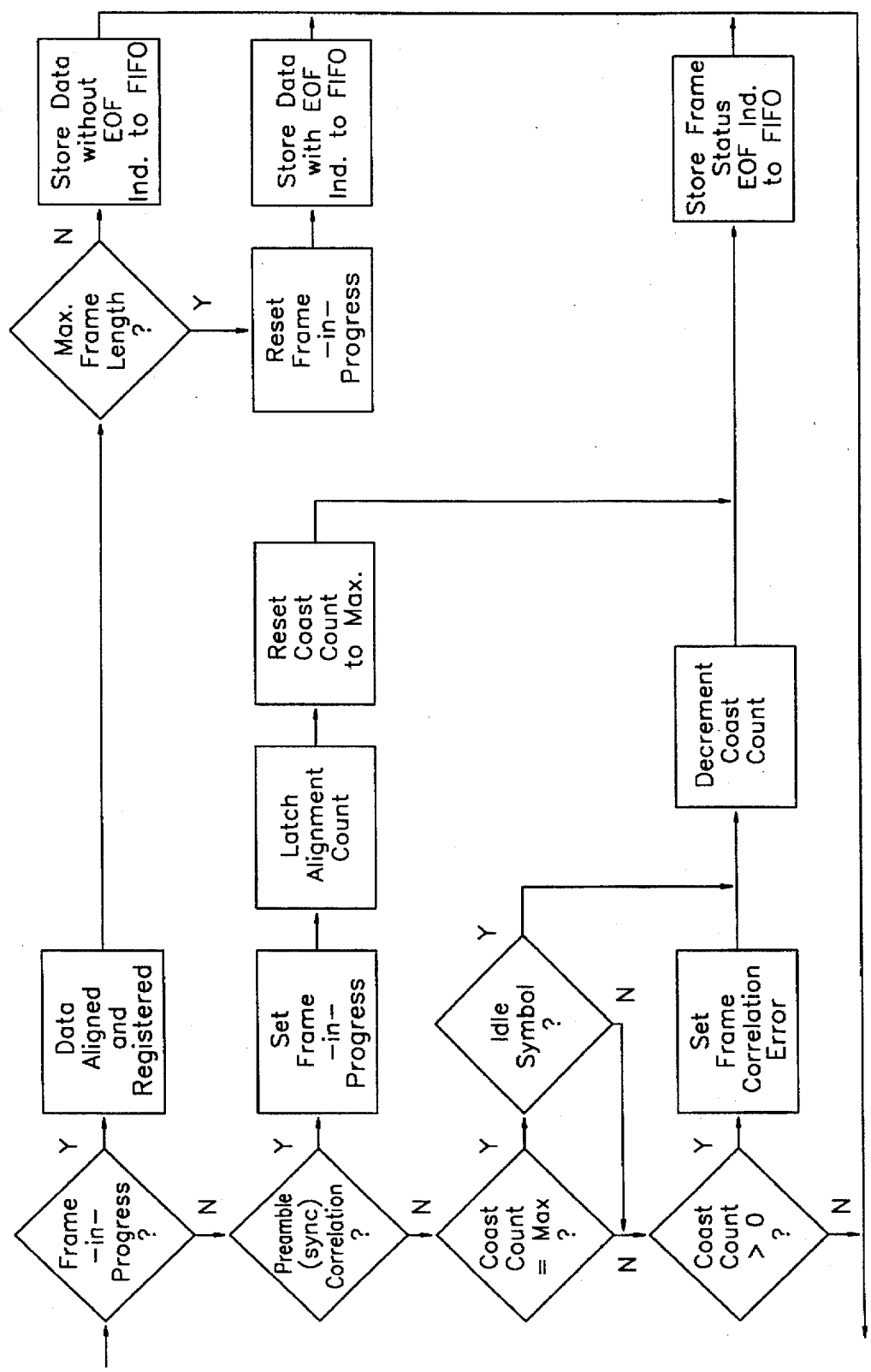
FIG. 4D shows a flow chart for identification and buffering an input data frame using an embedded preamble link protocol.

FIG. 4D shows a flow chart of the processing performed if the link protocol uses a start of data frame indicator which is embedded in the data stream at the beginning of the frames. The frames are taken when the port finds matches in the code of the preamble. A correlation between a delayed and shifted section of the input data stream and a reference preamble configured by the CSI 11 is performed as part of the preamble search. This permits a preamble sequence to be received that is either an exact match with or of an acceptable likeness to the error-free preamble sequence. Where more than one bit is used to input data, the preamble sequence is not assumed to be aligned with the input sequence. An alignment count is used to align the input with the preamble sequence. The alignment count is overwritten to a new value with every input data frame. Like other protocols, an idle sequence is used to keep the receiver in synchronization with the sender when no data frames are sent.

The beginning of a data frame is typically indicated by the preamble sequence. A data frame may also indicate where a preamble sequence is expected but not received when so configured. The coast data frame condition occurs immediately following a data frame where neither one or more idle sequences nor a preamble sequence has been detected. The CSI 11 configures the port to force a certain number of coast data frames before requiring a preamble sequence in order for a new data frame to begin. In other words, the frames are accepted until a certain period has expired. The end of a data frame occurs when the number of input bytes equals the maximum data frame size configured by the CSI 11. Since the frames are assumed to be fixed size for the use of coast framing, the EOF is implied.

Data frames and their corresponding frame status information are stored in a first-in, first-out (FIFO) buffer 2 as shown in the block diagram of FIG. 5. The contents of the FIFO buffer 2 consists of data entries which comprise a data frame, followed by a single status information entry which corresponds to the previous data frame. For each data frame, status information corresponding to the reception events of that frame is inserted into the data stream immediately following the data frame. This allows an accurate accounting of status information (data size, frame type, maximum frame size, parity error) of a given data frame to track that data frame as it moves through the switch fabric without CSI 11 intervention. Even parity is stored with each data entry. The last data of a frame and its status information entry is uniquely marked by changing the parity stored to be odd and using the one bit control field to indicate status rather than data.

Data frame boundaries are detected at the output of the FIFO buffer 2 by applying a majority voting mechanism on the three bits of tag information: two parity bits and the data/status bit. The majority voting adds a level of fault tolerance to the process of identifying the type of entry, and thus the end of the data frame, by permitting one of the three bits of any entry to be in error without improperly identifying the entry as either data or status.

Since the data frame status may be used to determine the integrity of the data frame, the data frame status must be ensured. The status parity is regenerated as the status is removed from the Input FIFO Buffer 2 and used to check the output status parity in order to identify status problems. The result of this parity check is injected into the outgoing status. This helps expose status parity failures which might otherwise be masked by the voting process.

Figure 6A:
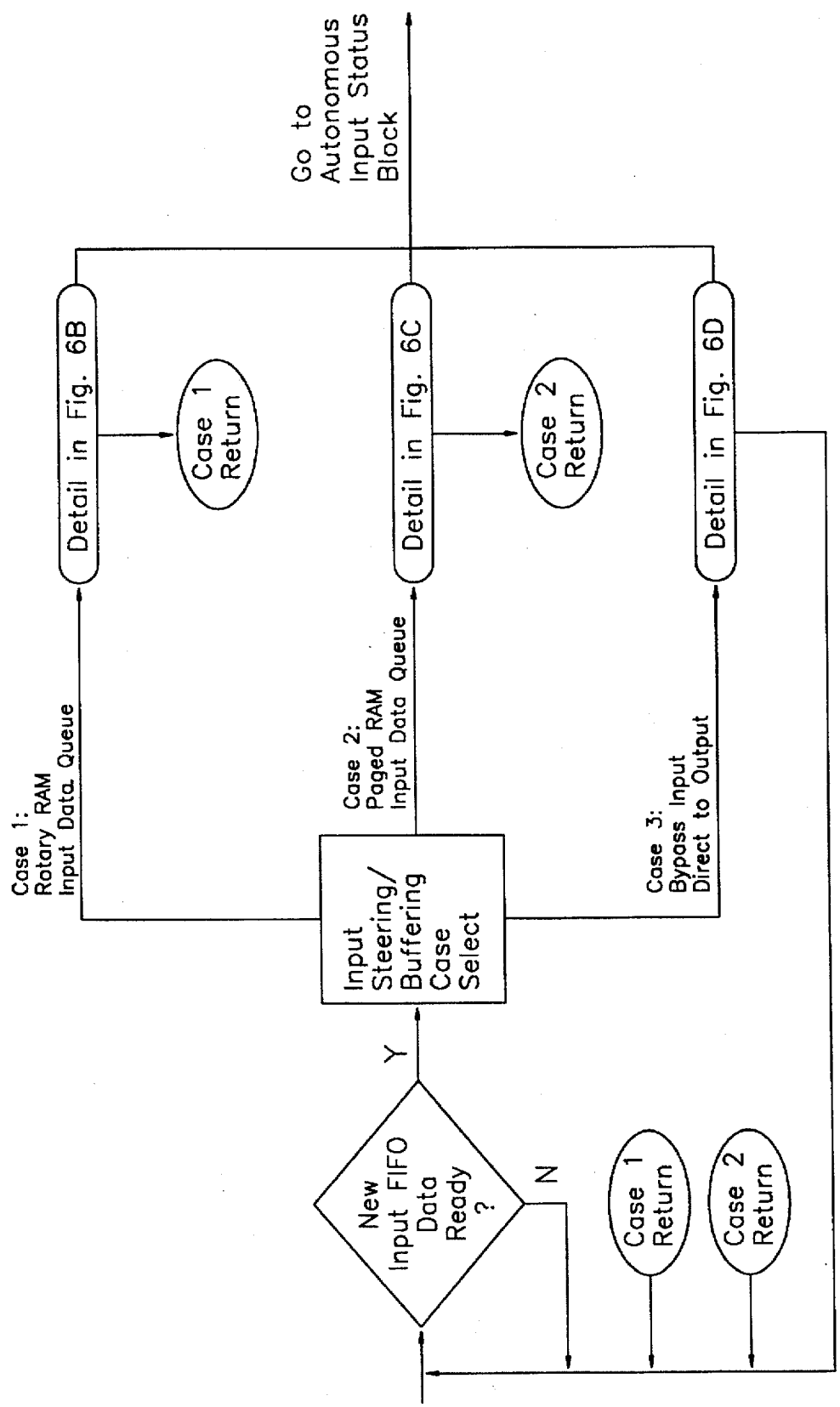
FIG. 6A shows a flow chart for the input data steering based on the RAM buffering style and allocation designated for an input data frame.

FIG. 6A shows a flow chart of the processing performed by the Input Direct Memory Access Controller 3 that takes place after removing the number of FIFO buffer 2 entries required to produce a single data token used by local memory 7a, central shared memory 6 or the direct path to an output port 13 within 4. A data token is data input that is not the length of a complete data frame. Data tokens are stored together in the memory to fill the data frame space in the memory.

Two modes of buffering are provided since packet statistics and sizes may widely vary for each port 7: rotary input queuing and paged input queuing. Rotary input queuing is used when the input statistics relating to the data are predictable and the individual packet sizes are not predictable. Rotary input queuing requires less CSI processing overhead but does not provide support for priority queuing. Paged input queuing is used when the individual packet sizes are predictable, but the input statistics are not. Paged input queuing supports priority queuing but produces increased memory fragmentation which requires CSI overhead to manage. After the data packet is moved to a memory, the switch port 7 informs the central switch intelligence 11 of the detection of a data packet and the move of the data to memory.

Sometimes the data bypasses memory and is sent directly to the output. A data token represents that portion of a frame that is transferred out of the input buffer 2. The data token is steered as specified in configuration data supplied by the CSI 11. Data tokens are used to reconstruct the data frame in memory using either a single rotary buffer or a previously determined page size buffer. The data frame memory buffers may be local and thus, not require the use of the AIB 5.

The memory includes input mails which contain the packet status, the packet range and the next available address of the input data queue. After each packet of data is written to the memory, the input mail status register which contains the status of the last packet written, where the starting point of the next packet is, and where the next mail is to be placed. If the data is going to the local memory 7a, then the header of each input packet each input mail. The header size is specified in the input configuration register.

Figure 6B:
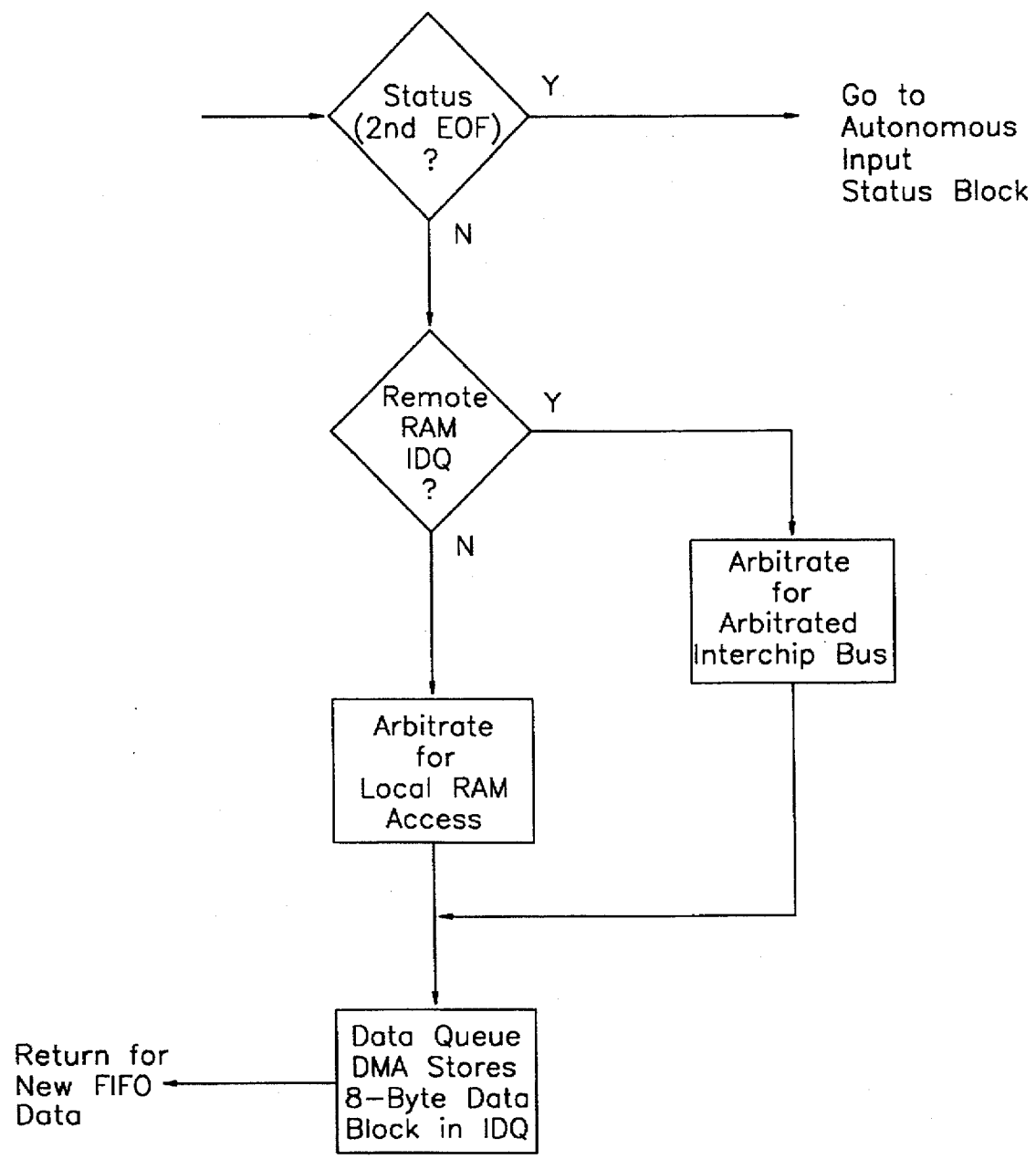
FIG. 6B shows a flow chart for the routing of input data using a queue of data buffer pointer and control structures for variable sized, sequentially stored buffers.

FIG. 6B shows the flow chart of the processing performed on a data token if rotary buffer processing is configured by the CSI 11. When describing data structures, rotary buffers are also referred to as circular buffers. An rotary Input Data Queue (IDQ) is created in central shared memory 6 by the CSI configuring the Input Frame Steering 4 with a starting address and a size, either directly or through the use of an ending address. Each entry in the IDQ is a data frame. The IDQ is filled as data is input to the system 20a using either the AIB 5 or the dedicated Local Memory Interface. Data frames are placed in the IDQ in a contiguous fashion until the IDQ size has been exhausted. The IDQ then wraps back to the starting location and continues placing data in memory. Also, the switch port 7 sends an input mail to the central switch intelligence 11 with an input mail which contains the information of the packet status, packet size and the next address of the input queue. The next address of the input queue and of the input mail box is updated in the switch port 7.

Figure 6C:
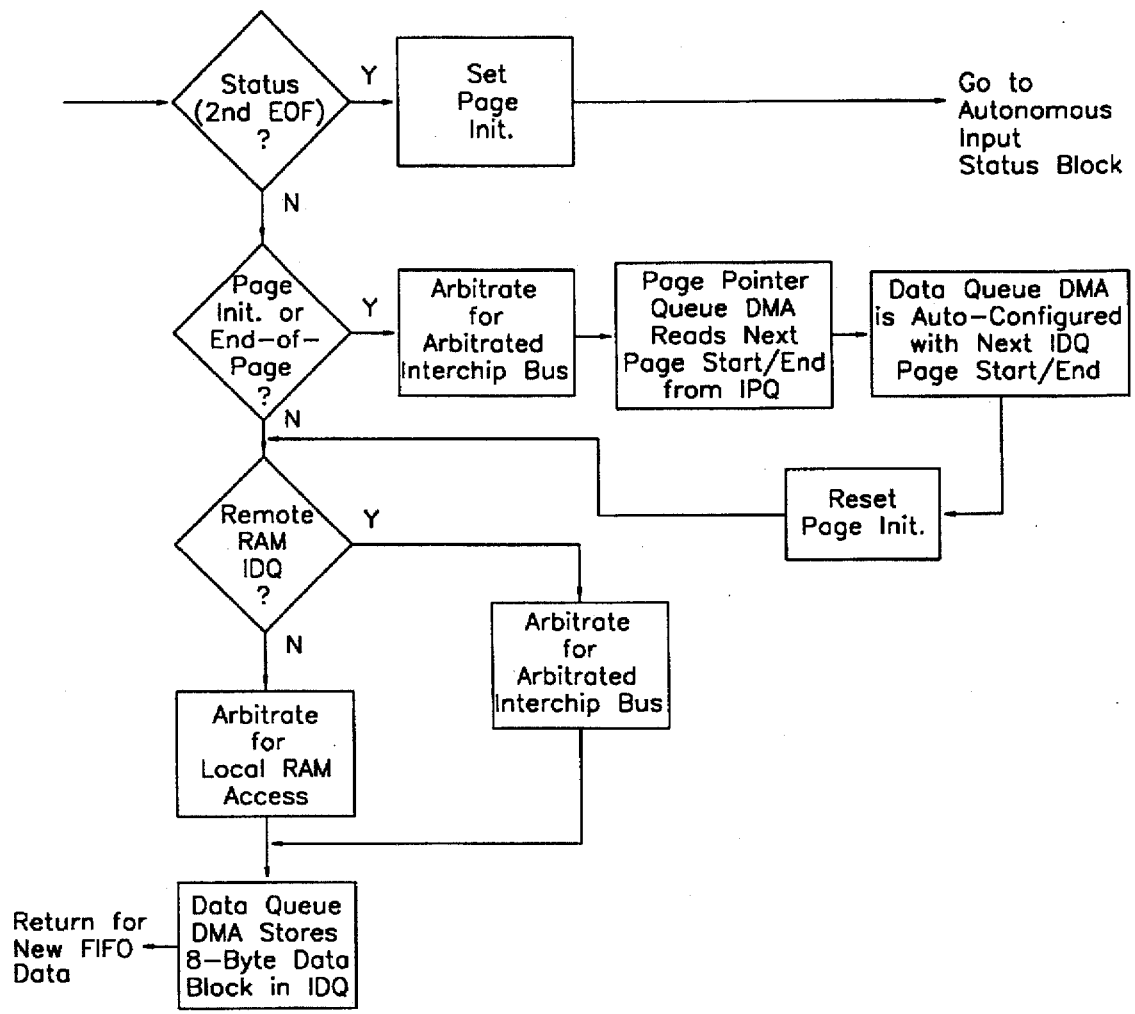
FIG. 6C shows a flow chart for the routing of input data using a queue of data buffer pointer and control structures for previously sized, location independent buffers.

FIG. 6C shows the processing performed on a data token if paged buffer processing is selected. An Input Page Queue (IPQ) is formed by the CSI 11 as a list of data frame DMA descriptors. Each DMA descriptor is used by the Input Data Steering 4 for placing data frames in memory. Paged input queuing occurs when the switch ports 7 acquire page pointers from an input queue list and loads this information into an input range register. The switch port 7 then loads the incoming packet into the input queue specified by the input register. If the end of the packet is not sensed, the previous steps are repeated. After the end of packet is detected, the switch port 7 updates the input mailbox with input mail containing information regarding the packet status, packet size and address of the next input queue of the next available page pointer. The input mail status is updated containing the status of the latest packet written to the input queue, next address of the input queue and next address of the input mailbox.

Figure 6D:
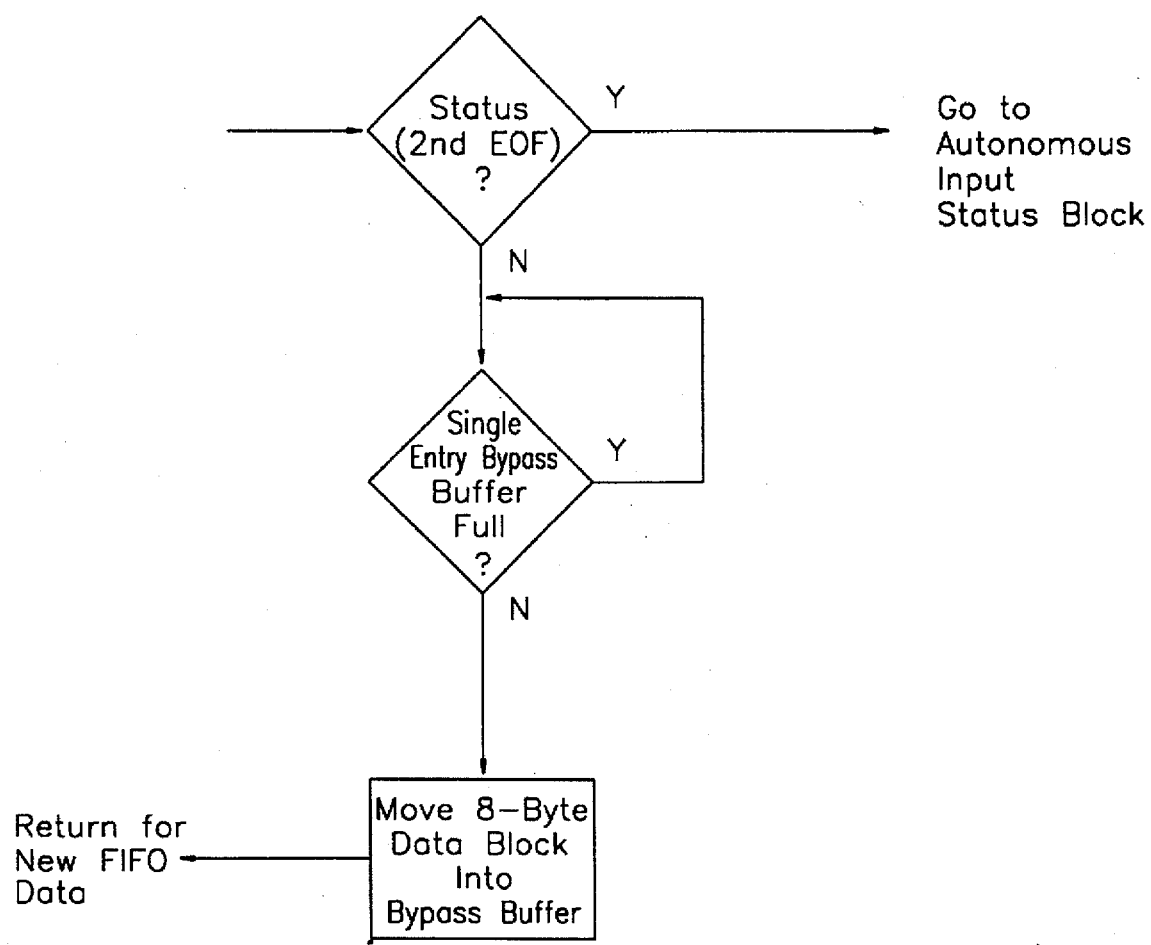
FIG. 6D shows a flow chart for the routing of input data directly to the output.

Configuration of the input steering control 4 for bypassing memory and going directly to an output port 13 results in the processing shown in the flow chart of FIG. 6D. Data is transferred directly from the Input FIFO Buffer 2 into the Output FIFO Buffer 9.

Figure 7A:
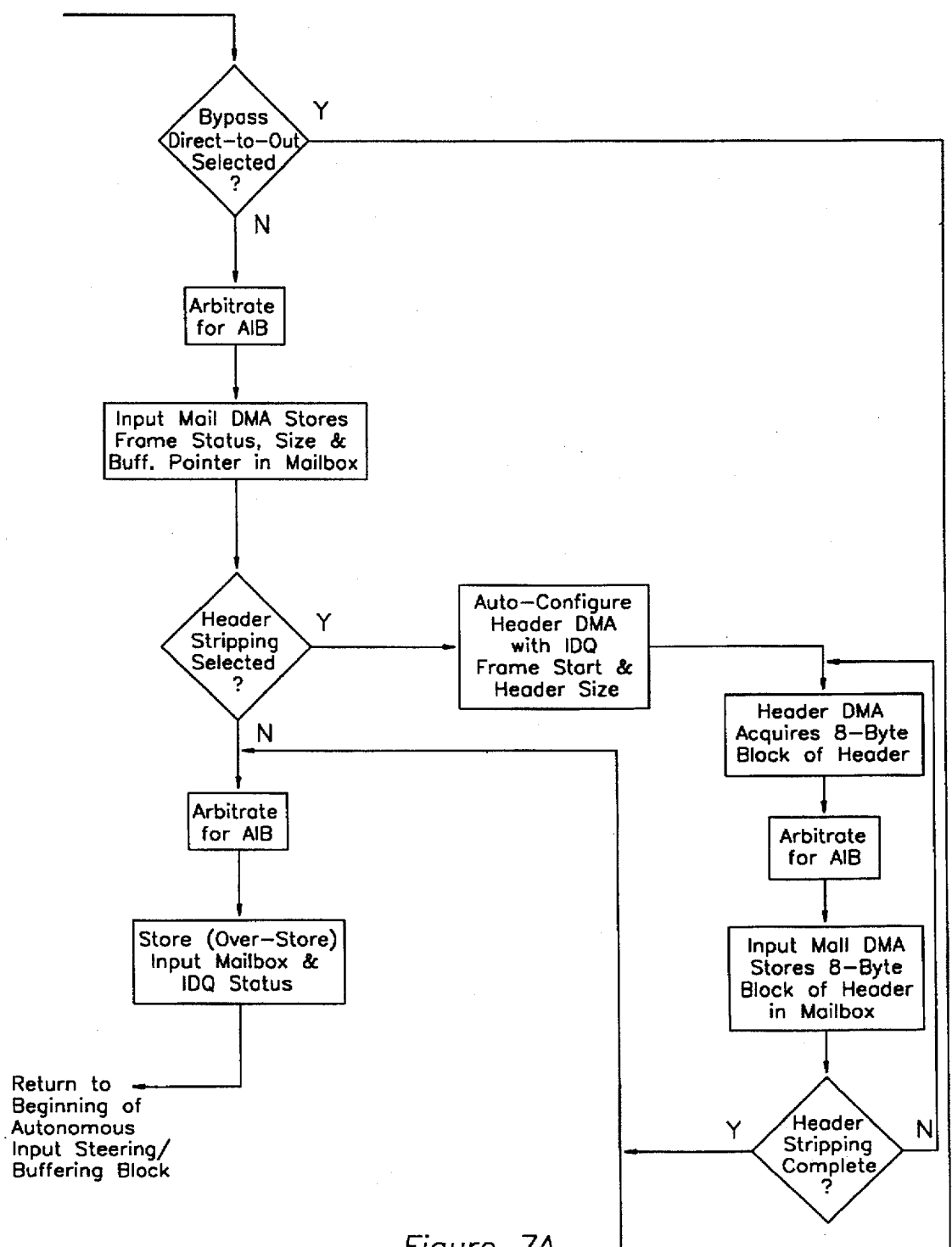
FIG. 7A shows a flow chart for storing the input data queue status and implementing optional header stripping as part of the processing performed after an input data frame has been stored in local memory rather than central shared memory.

FIG. 7A shows a flow chart of the operations performed once a complete data frame has been transferred to the destination. An indication of which input buffer 2 was filled and the input status information is placed in memory. Optionally, the header may need to be made conveniently available to the Central Switch Intelligence (CSI) 11 by placing it in central shared memory 6, reducing the need for the CSI 11 to use the AIB 5.

Figure 7B:
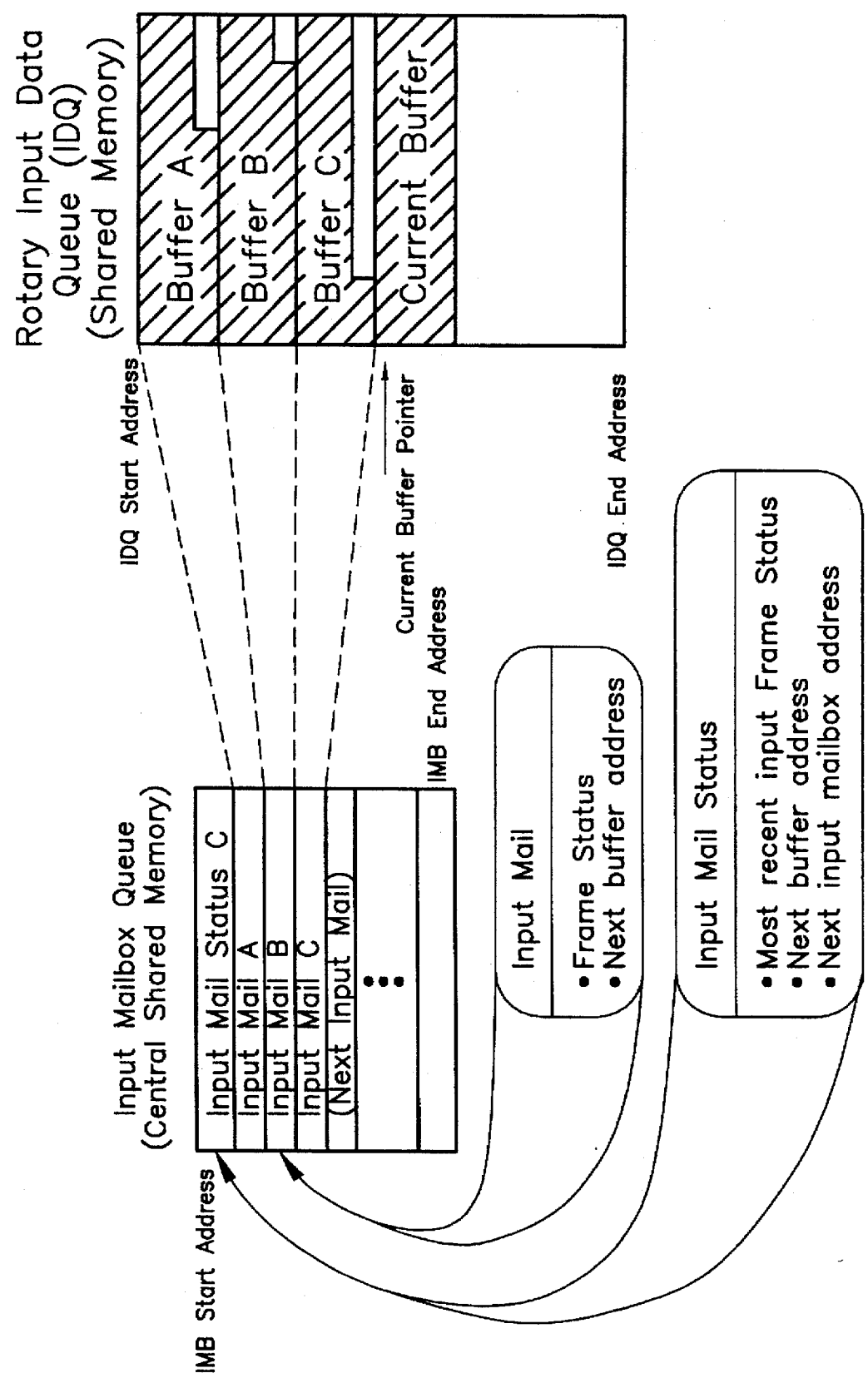
FIG. 7B shows a block diagram of the input status queue and its relationship to the input data queue for the rotary buffer case.
Figure 7C:
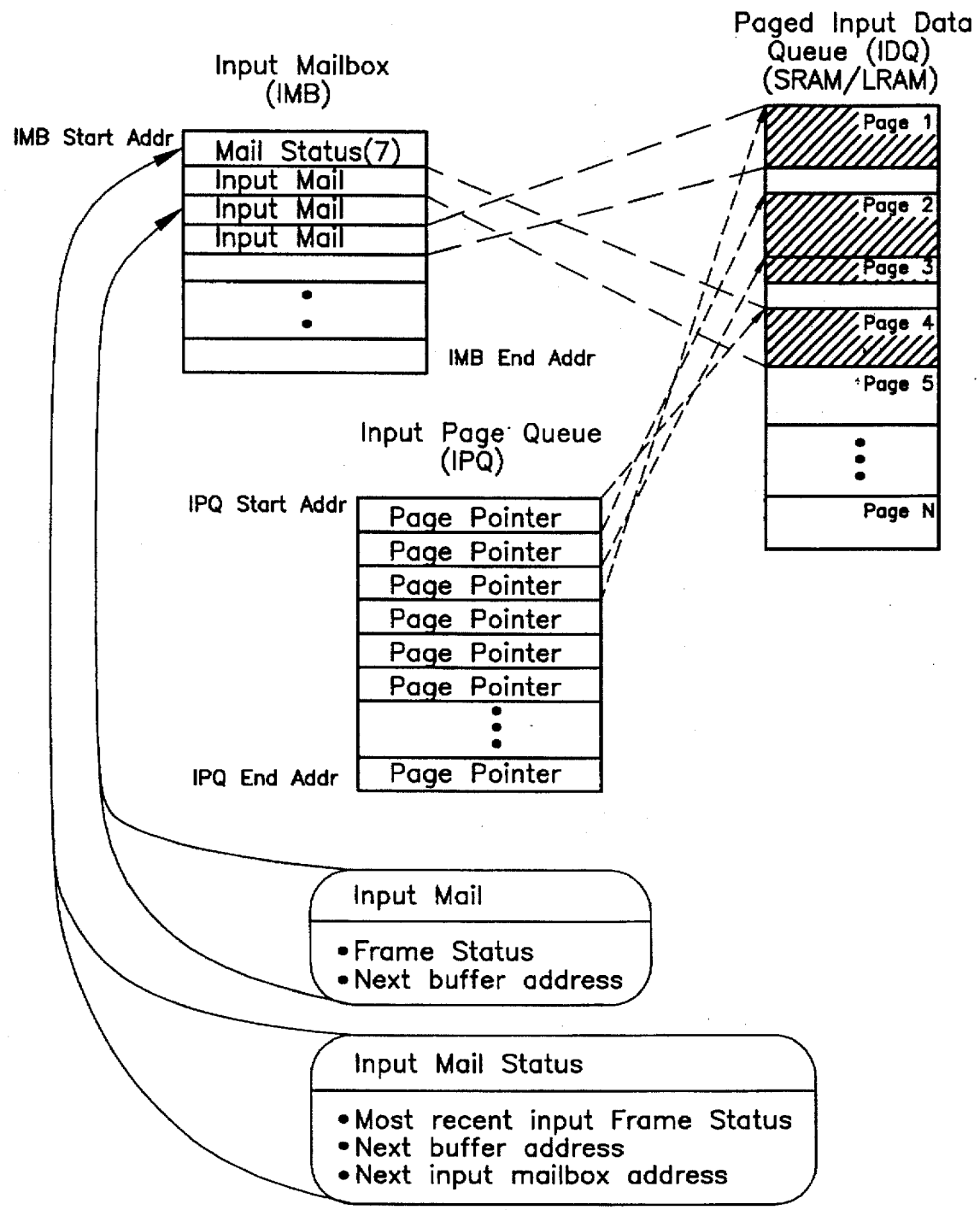
FIG. 7C shows a block diagram of the input status queue and its relationship to the input data queue for the paged buffer case.

FIG. 7B shows the structure and contents of the input status reporting queue called an Input Mailbox Queue with respect to input data frames placed into a rotary FIG. 7C shows the structure and contents of the input status reporting queue called an Input Mailbox Queue with respect to input data frames placed into a paged IDQ. The structure of the status reporting queue is the same and the contents represents the same Input FIFO Buffer 2 information. Each time the end of the data frame is detected, the most previous data frame status, the next IDQ address and the next Input Mailbox address are placed in the next entry at the end of the Input Mailbox. Optionally, the header may need to be made conveniently available to the CSI 11 by placing it in shared central shared memory 6, reducing the need for the CSI 11 to directly access the data frame buffer 2 areas to acquire header information. This acquisition could consume overall CAB switch internal data path bandwidth, which results in decreased switch data throughput, especially if frame data buffering has been designated for storage in switch port Local Memory 7a. Lastly, the Input Frame Steering 4 places the most previous frame status and IDQ starting address at the top of the a list called the Input Mailbox. A single point for information on the current status of any input port 12 is provided the CSI 11. The mechanism of queuing status reports provides the CSI 11 with the option of operating asynchronously with the arrival of data frames, making it possible for the CSI 11 to process more than one frame at a time. This is significant in avoiding the overhead involved in repeatedly switching the context of CSI 11 processing.

Figure 8:
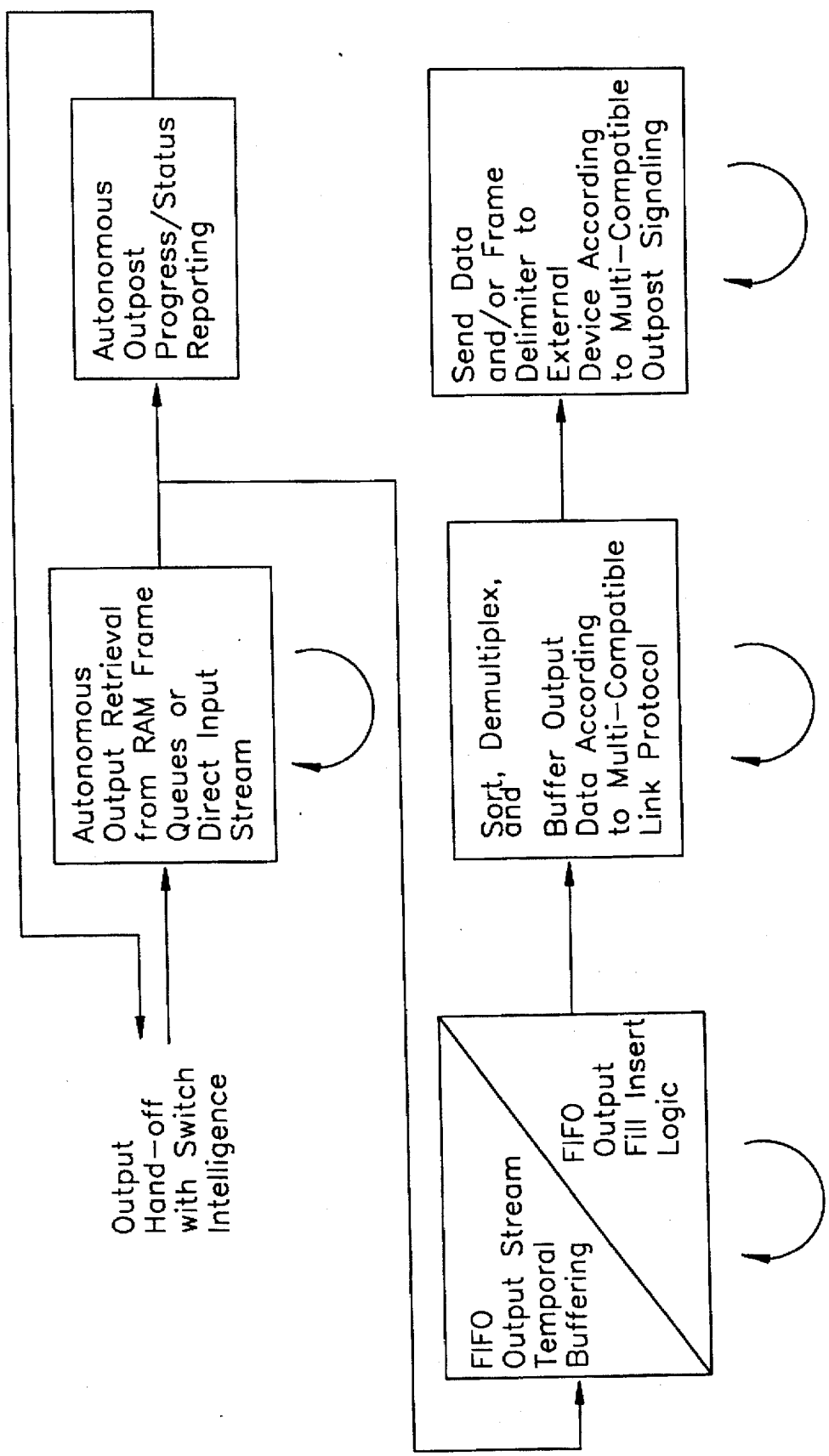
FIG. 8 shows a flow chart of the data input process control detailed further in the embodiment of FIG. 9A sequentially up to and including FIG. 12D.

FIG. 8 shows a flow chart of the operations performed on output data. It is helpful to remember that the data is an endless stream of frames and that the output is changing the frames back into the bit stream. In the data output operation, a data pattern is inserted into the output data stream repeatedly. The data output operation is similar to the data input operation. The switch port 7 starts to read from the central shared memory 6 or the local memory 7a when the output mailbox indicates that data to be output is available. The retrieval process will continue retrieving the data from the next address as long as the mailbox indicates that another data is ready to be output.

The source of data for an output port 13 is configured by the CSI 11 to be either memory or an input port 12. The output data frame is broken into tokens and transferred to the output port FIFO buffer 9. Multicasting allows several elements on a common communication line to receive common information. In the present invention, the switch ports 7 are the several elements which are connected to the AIB 5 which is the communication line between the switch ports 7. Further, multicasting utilizes one master and a multiple number of slaves in communication with the one master. The use of multicasting of data across the AIB 5 allows more than one output port 13 to receive the data frame. When the entire data frame has been transferred, this condition is reported to the CSI 11 using separate mailboxes in central shared memory 6. The data frame is sent out in accordance with the link protocol for the output port 13. Each output port 13 may support different link protocols or may be configured for the same link protocol.

Figure 9A:
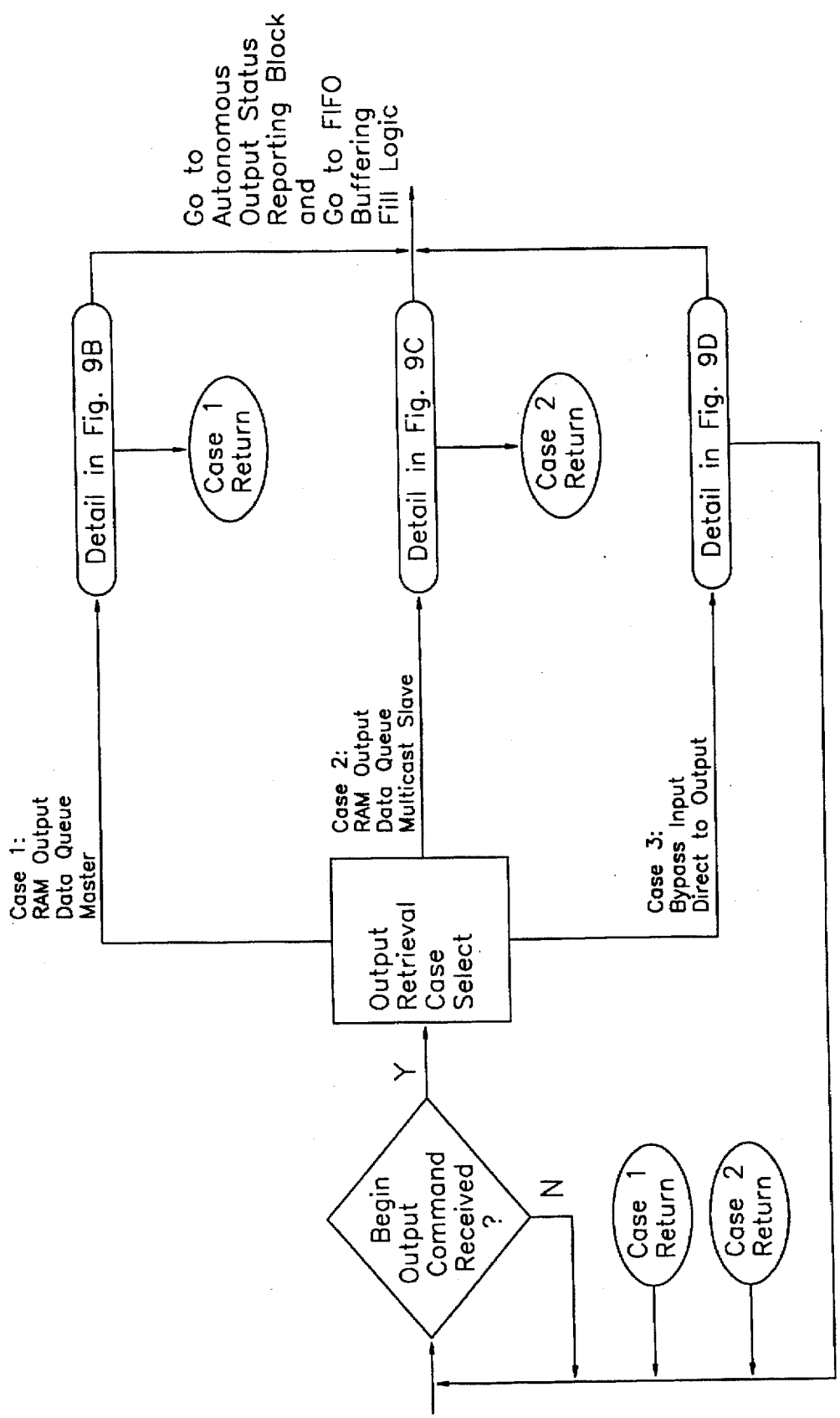
FIG. 9A shows a flow chart for the selection of output data steering based on the source of data and the data acquisition mode.

FIG. 9A shows a flow chart of the processing performed by the Output Direct Memory Access Controller (DMAC) 8 to send a data frame to the FIFO buffer 2 of one or more output ports 13. The source of the data frame is configured by the CSI 11 and may be memory or an input port 12.

In the case of memory, data transfers may be initiated by the AIB 5 with a master which is one of the switch ports 7 and one or more multicast slaves which are the other switch ports 7. AIB master operations are depicted in the flow chart of FIG. 9B. Data segments are linked together using DMA descriptors to form a data frame. Each DMA descriptor points to a starting location in memory and defines the number of memory locations the data segment consists of. The DMA descriptor also provides DMA control information such as frame boundaries by the 'End of Frame' indicator and the end of a DMA chain by the 'End of Chain' indicator. A typical example of the formation of a data frame is one which consists of two DMA descriptors: one for the header and the other for the rest of the frame. Until the 'End of Frame' is detected, data transfers on the AIB 5 are initiated by the output port without concern for passing on framing information. Multiple data frames may be formed by linking data frame descriptors to form the entire output data chain. This allows a stream of frames to be output without processor intervention. Where link protocols require the use of fill patterns or fill frames when data frames are not available, descriptor control indicators 'Fill Insert' and 'Block Repeat' are used at the end of the chain.

The output DMA activity is paced by the status of the FIFO buffer 2. The 'Not Full' FIFO buffer 2 condition allows DMA activity to continue. The 'Almost Empty' condition is used when the previous DMA descriptor output is to be repeated. The 'Almost Empty' condition is used to pace this activity.

Figure 9B:
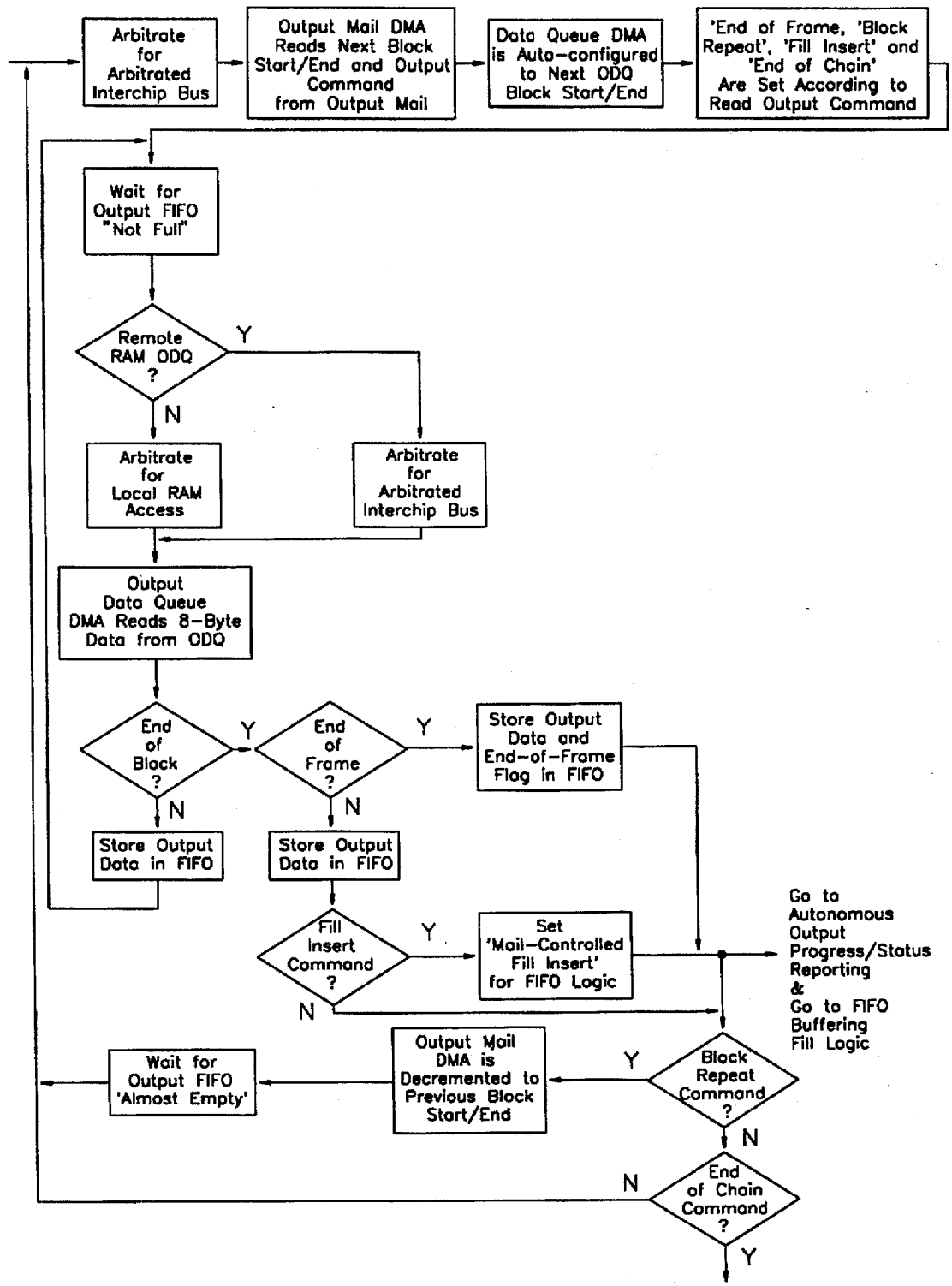
FIG. 9B shows a flow chart for retrieving output data from the output data queue as a DMA master.

The operations shown in the flow chart of FIG. 9B apply for initiating and performing data transfers. Until the end of the data frame is detected, data is read by the DMAC 8 and sent on to output port 13 using the Output FIFO Buffer 9.

Figure 9C:
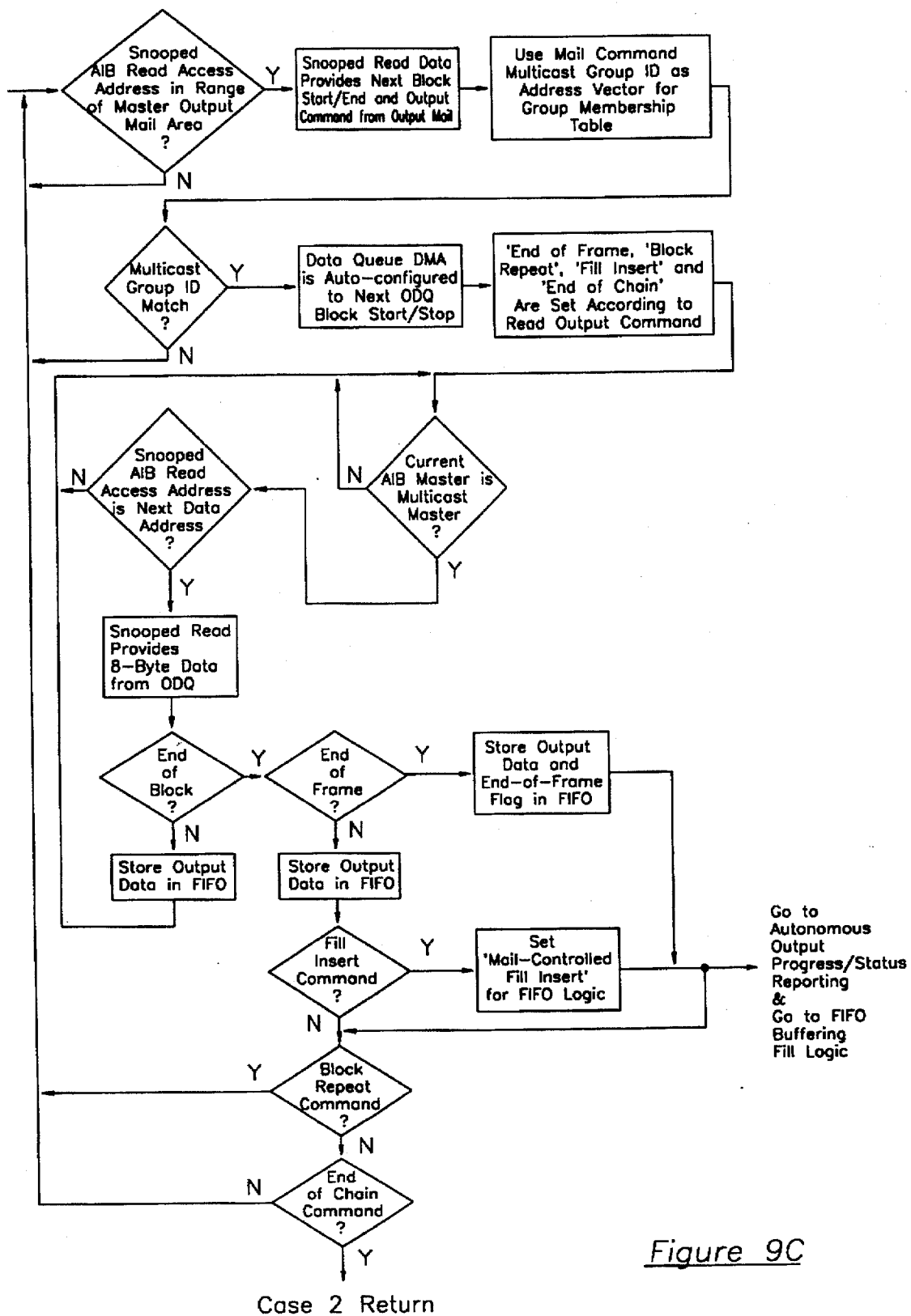
FIG. 9C shows a flow chart for retrieving output data from an Arbitrated Interchip Bus as a multicast slave.

FIG. 9C shows a flow chart of the operations performed by a multicast slave which are mutually exclusive of the operations performed by a DMA master. When data is transferred using the AIB 5 to more than one output port 13, a technique of receiving data by an output port other than the DMA master output port is used. This multicasting technique is commonly referred to as snooping. The multicast slave stays in lock-step with the multicast master output port initiating the data transfers. The multicast slave is configured to look for activity on a specific output DMAC 8 descriptor chain. The slave snoops the master identifier from the AIB interface logic and the DMA descriptor that precedes a data transfer sequence to determine if the data to follow is to be sent out its port. This allows for multiple output streams to contain the same data and ensure that the multicast slave will be able to stay in lock step with the master of the proper DMA output chain. The DMA descriptor control information contains an indication of the group identifier (ID) of which the DMA activity is a member.

The multicast slave snoops the control information that precedes a data frame to determine if the data to follow is to be sent out its port. The control information contains a virtual output channel identifier. The class of data frames to be snooped is determined from the multicast map entries maintained by the slave. All virtual channels to be snooped are flagged accordingly in the slave multicast map and may be all or only some fraction of data frames bound for the output port of the multicast master.

The set of data frames to be snooped is determined from the group membership table entries maintained by the multicast slave. All group IDs to be snooped are enabled according to entries in the slave group membership table which are dynamic and, therefore, subject to change between output chains. The multicast slave may be configured to snoop all or only some fraction of data frames bound for the output port DMA master according to the group IDs in each DMA descriptor. Many combinations of memberships across multicast slaves are possible. All master operations are shadowed in lock-step even if the current frame is for a group of which the multicast slave is not a member. However, data is not snooped for this condition.

Figure 9D:
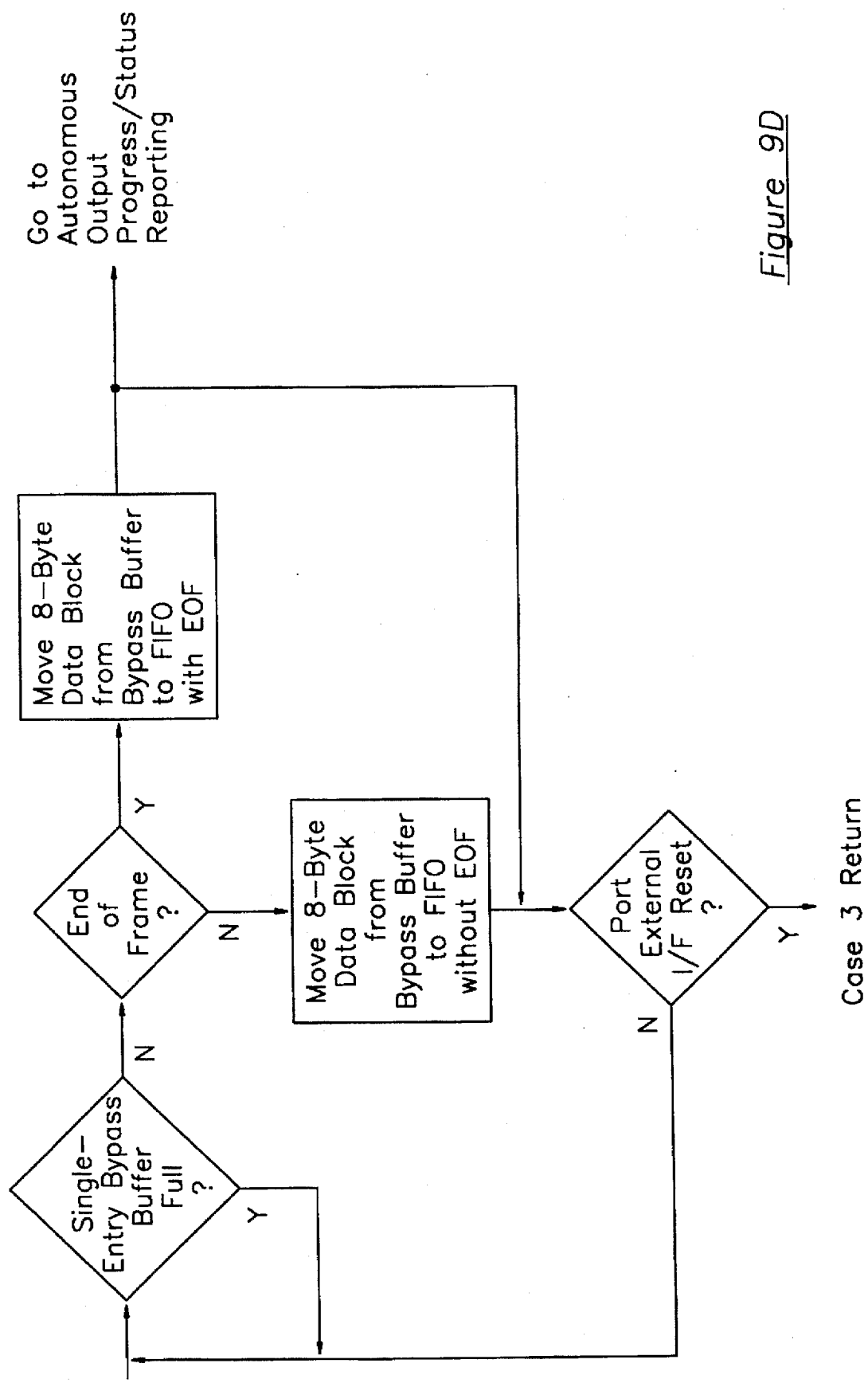
FIG. 9D shows a flow chart for retrieving data directly from the input buffer.

FIG. 9D shows a flow chart of the operations performed when data is transferred directly to the output port from an input port. This capability is called switch bypass routing wherein the data is never lead onto the AIB 5, but just rerouted to an output port 13. This capability of the present invention is to read data from external device and write to another external device completely bypassing the AIB 5. The data frame is broken into data tokens and placed directly into the Output FIFO buffer using routing resources in the data steering 4. Frame boundary information is maintained with the frame.

Any output port need not have the same channel capacity or output protocol as the source. In order to accommodate difference between the incoming data stream frame rate and the channel frame rate capacity, fill symbols or fill frames may be used in the channel. These may be sent between frames when the output FIFO condition indicates that the channel needs more data than the incoming data stream is providing. Since the output FIFO buffers 9 and fill requirements are independent of each other, output ports 13 may inject fill as required to maintain their channel capacity without CSI 11 intervention.

Figure 10A:
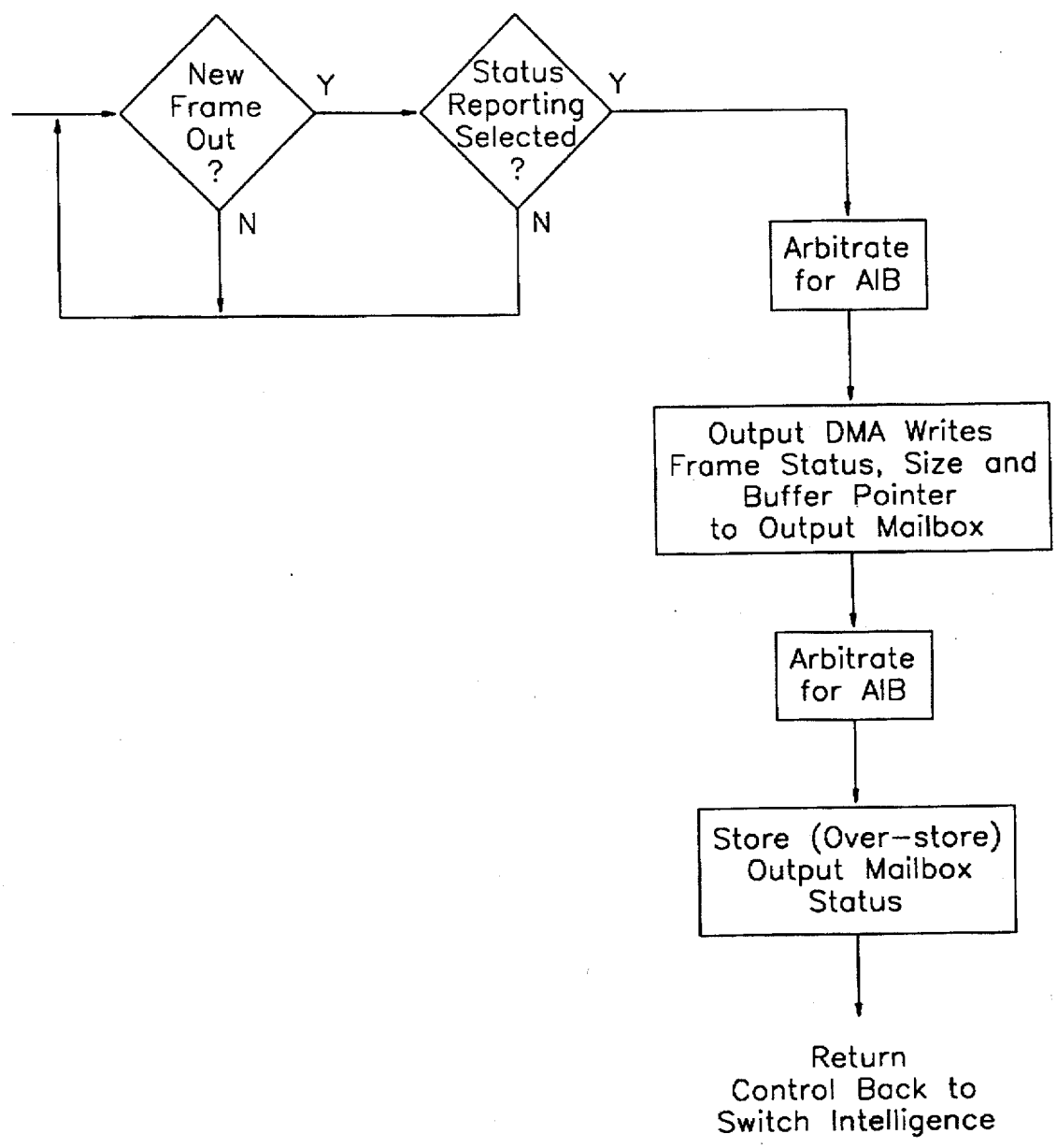
FIG. 10A shows a flow chart for the optional storage of the output status.
Figure 10B:
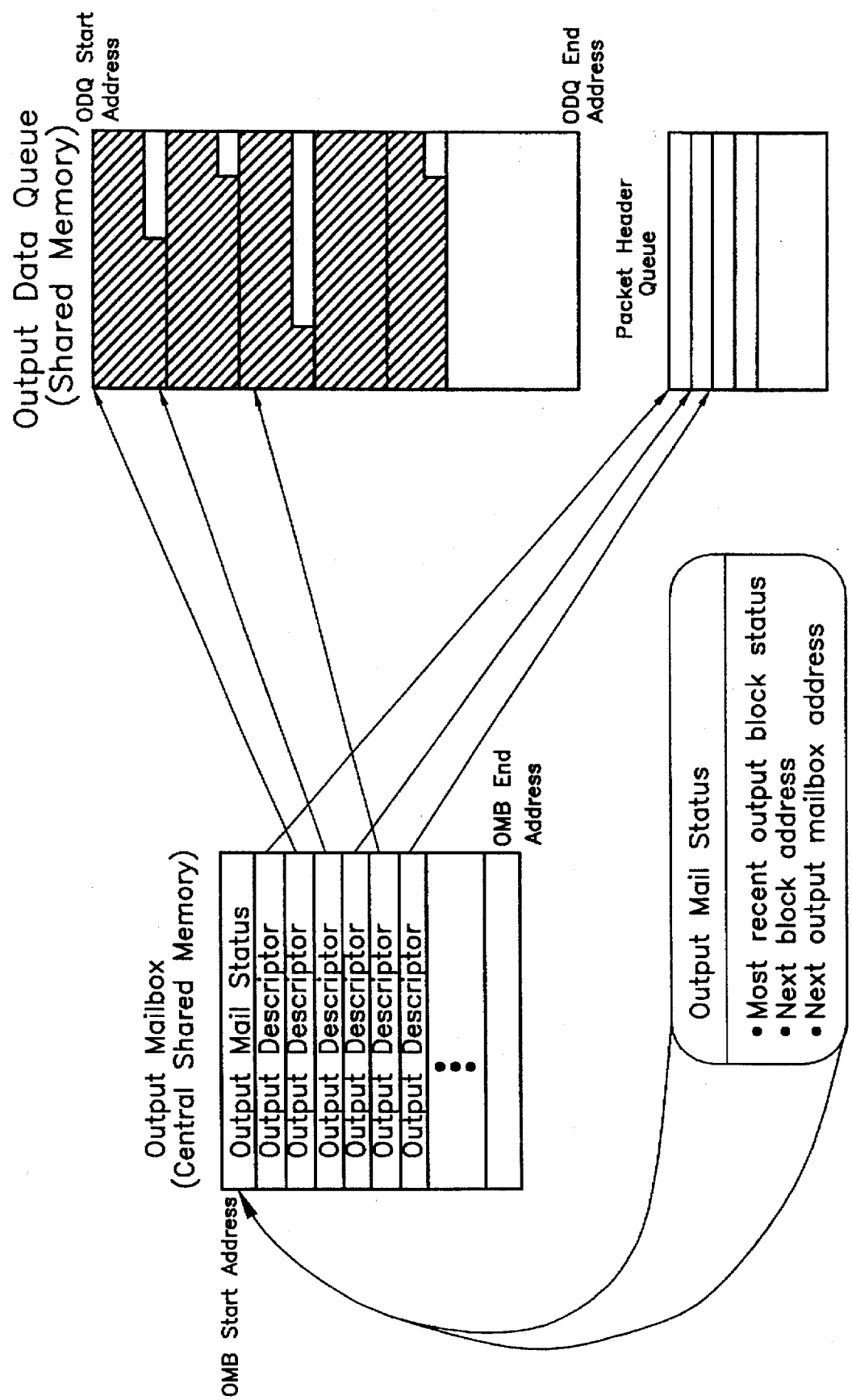
FIG. 10B shows a block diagram of output progress/status reporting as it relates to output data queue activity.

FIG. 10A shows a flow chart of the status reporting operation performed following the transfer of a data frame to one or more output ports 13. Reporting this information using a common central shared memory 6 Output Mailbox Queue entry reduces the software overhead involved in managing the CAB switch. When the end of a frame is detected, the address of the last message block, its status and the address of the next output mail are stored as output mail status. FIG. 10B is a block diagram showing the interaction of output status reporting with the ODQ and other queues.

Figure 11A:
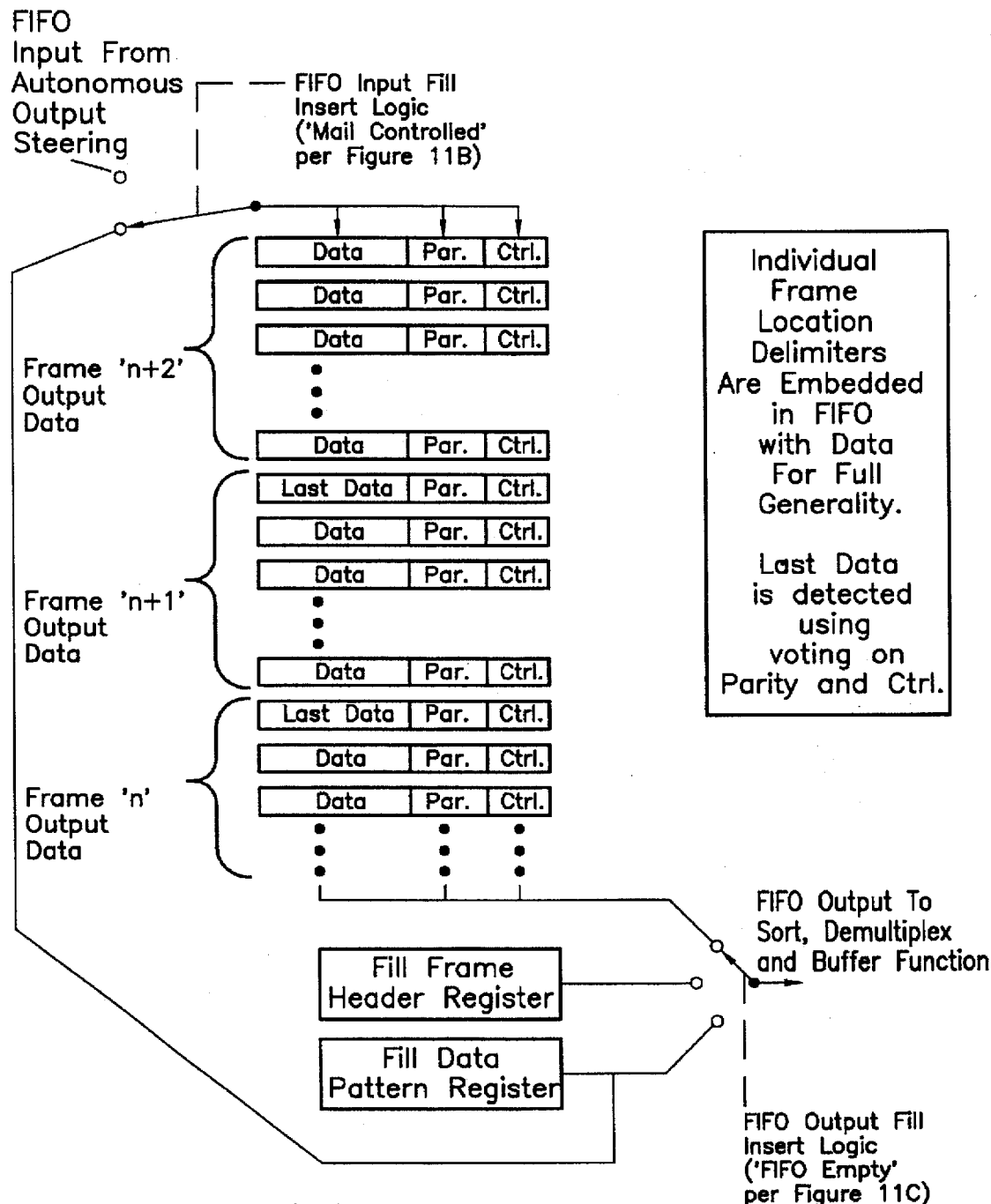
FIG. 11A shows a functional block diagram of the temporal buffering of data frames in a first-in, first-out data queue with frame boundary markers.

Data frames are stored in a first-in, first-out (FIFO) buffer 9 for each output port 13 as shown in the block diagram of FIG. 11A. The contents of the FIFO buffer 2 consists of data entries which comprise a data frame. Even parity is stored with each data entry. The last data entry for a frame is uniquely marked by changing the parity stored to be odd and using the one bit control field to indicate the last data entry. Data frame boundaries are detected at the output of the FIFO buffer 2 by applying a majority voting mechanism on the three bits of tag information: two parity bits and the data framing bit. The majority voting adds a level of fault tolerance to the process of identifying the type of entry, and thus the end of the data frame, by permitting one of the three bits of any entry to be in error without improperly identifying the entry as either data or status.

Figure 11B:
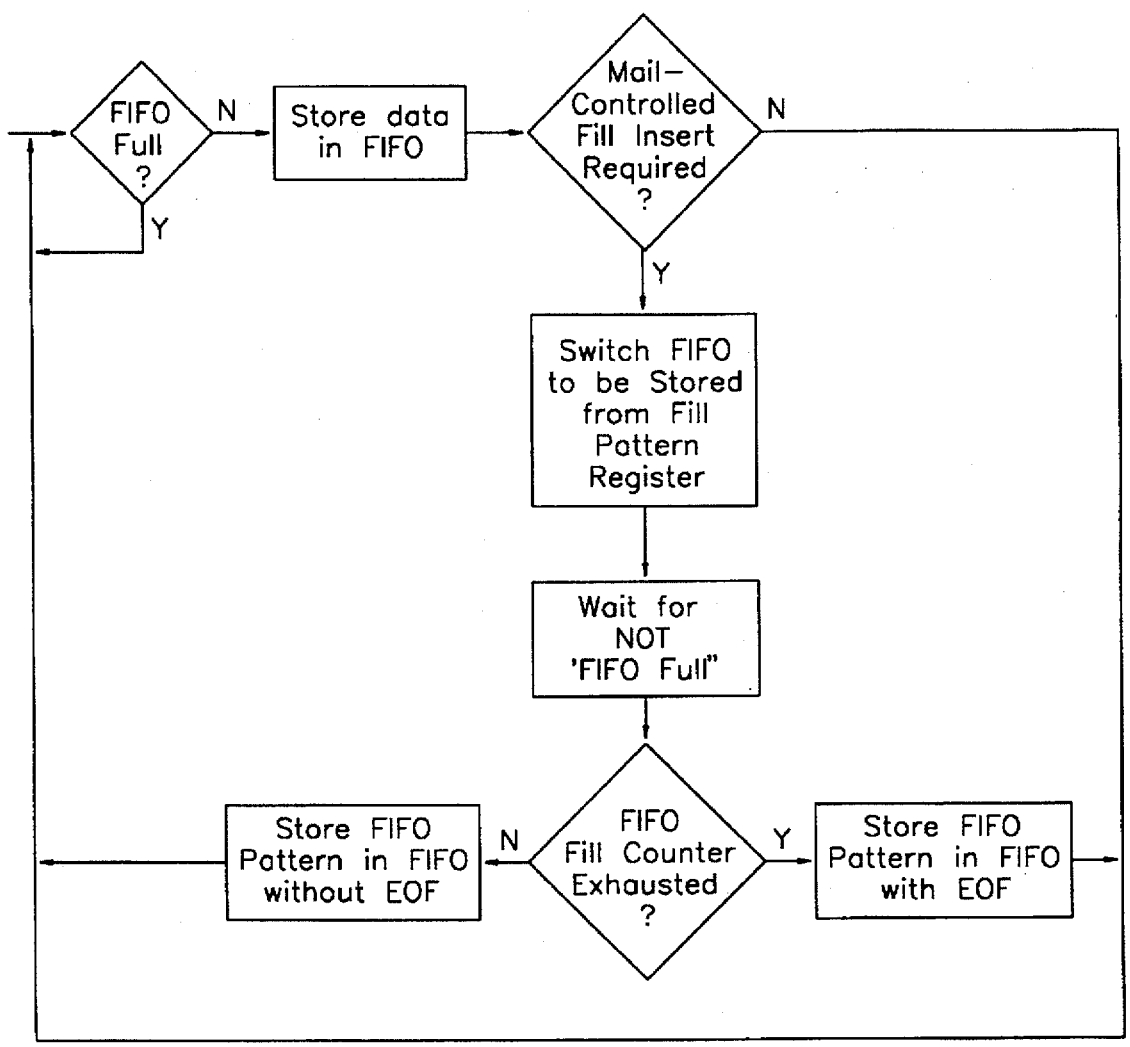
FIG. 11B shows a flow chart for inserting fill data into the first-in, first-out (FIFO) buffer.

The input of the FIFO buffer 2 may come from DMA activity as a master, data frame snooping as a multicast slave or memory bypass directly from an input port. Fill frames may also be injected in the output frame stream if output DMA descriptor control information indicates a fill frame is to inserted. The control which performs the FIFO data path input selection is shown in FIG. 11B. A fill frame involves a fill header stored as configuration data by the output port and fill pattern which is generated by the output port logic. Fill frames may also be injected directly to the output if the FIFO buffer 2 status indicates one of two conditions: 'FIFO Empty' or 'FIFO Almost Empty' and the output is configured to insert fill frames.

Figure 11C:
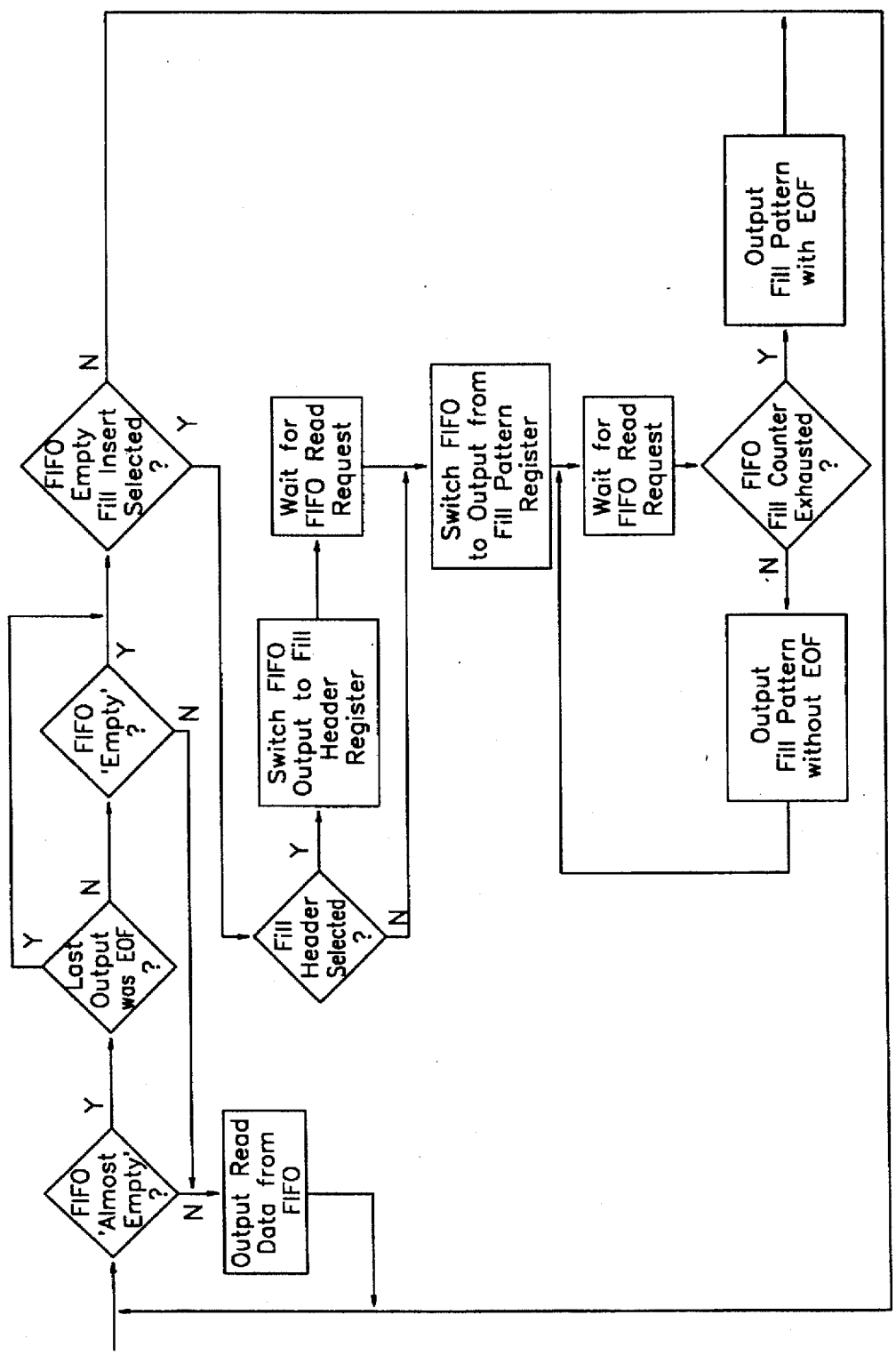
FIG. 11C shows a flow chart for inserting data into the FIFO buffer output stream.

The control for the output stream data selection is described in FIG. 11C. In the case of 'FIFO Empty', no output data frame stream is present and fill frames are required. In the case of the 'FIFO Almost Empty', the output stream frame rate does not match the channel capacity and fill frames are required. Data frames may be placed into the FIFO buffer 2 simultaneous with the output of a fill frame. The 'FIFO Almost Empty' provides hysteresis in the output control by not allowing the FIFO buffer 2 to supply data until the FIFO status indicates there is an adequate amount of data in the FIFO buffer 2. The injection of fill frames is performed without CSI 11 intervention. Since the slave is slower, filler frame are required to fill gaps. If the FIFO is empty, the fill frames keep the synchronization going.

Figure 12A:
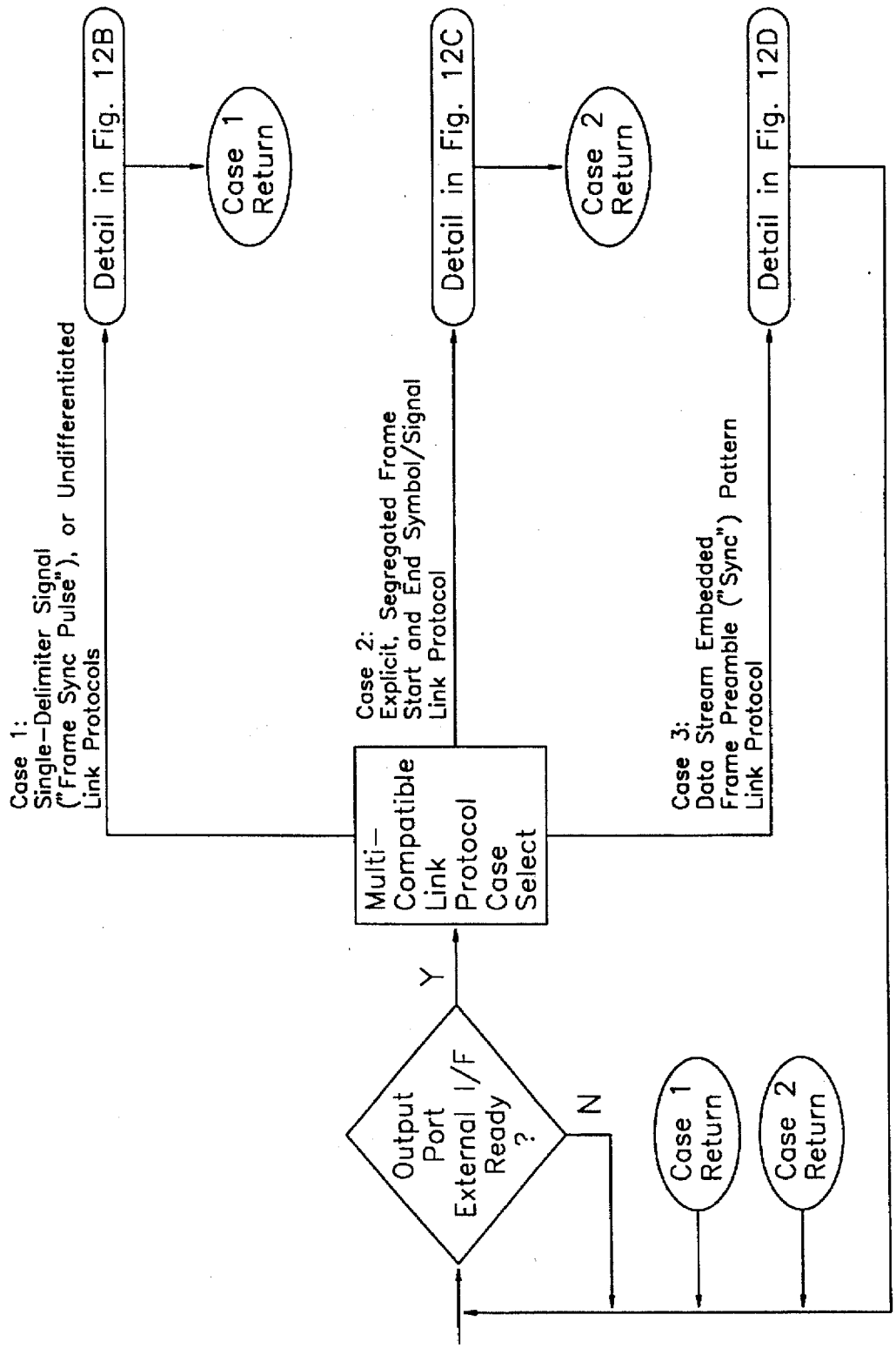
FIG. 12A shows a flow chart for buffering and framing output data based on the link protocol.

FIG. 12A shows a flow chart of the operations performed by the Output Link Protocol Controller 10 to output data based on the link protocol as configured by the CSI 11. Any combination of link protocols are used. Data is buffered with the Output FIFO Buffer 9 and output once the data frame has been established according to the link protocol. The FIFO buffer 9 must reach or exceed the number of entries configured by the CSI 11 before a new data frame is established. The protocols described by FIG. 12B, 12C and 12D have been described above for discussing the corresponding input operations shown in FIG. 4B, FIG. 4C and FIG. 4D, respectively. The output protocol processing differs slightly from the input in that a data frame trailer sequence consisting of a cyclic redundancy code may be provided. The logic required to generate this sequence is contained within the Output FIFO Buffer output data path since this code sequence is calculated directly from the data as a data frame passes to the external port.

Figure 12B:
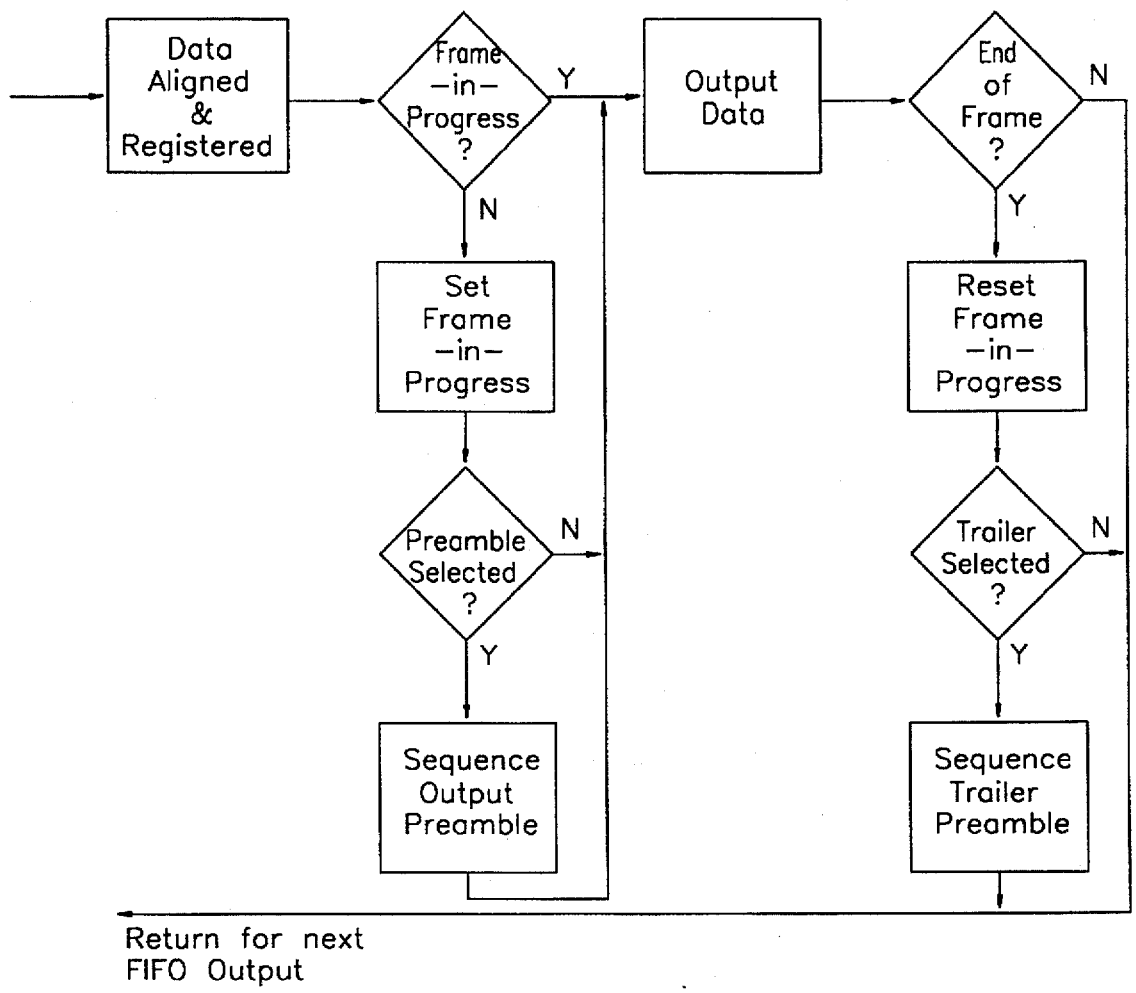
FIG. 12B shows a flow chart for identification and buffering an output data frame using a single-delimiter, or an undifferentiated link protocol.
Figure 12C:
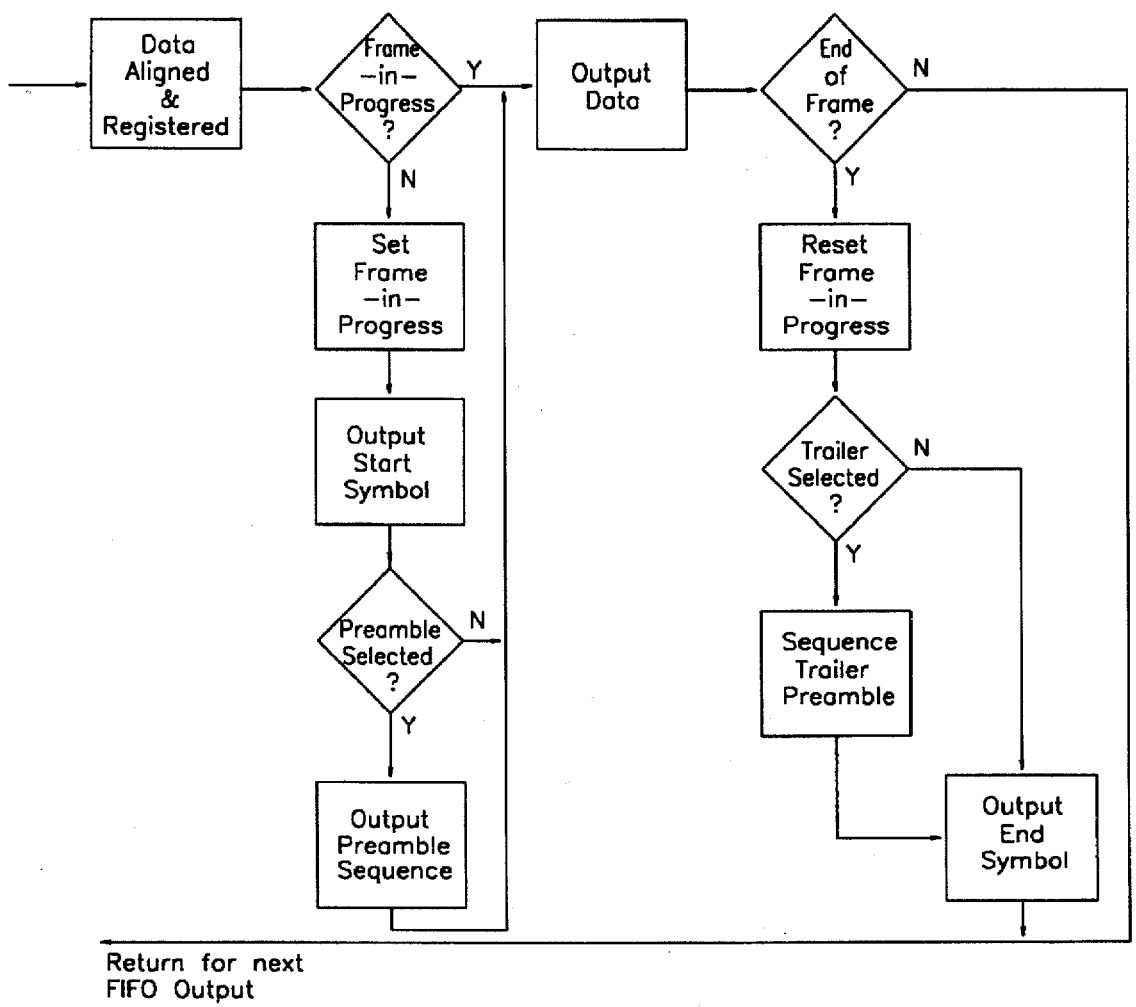
FIG. 12C shows a flow chart for identification and buffering an output data frame using a explicit start and end symbol/signal link protocol.

FIG. 12B shows a flow chart detailing the single-delimiter or undifferentiated link protocol operations used to start and end a data frame. A programmable data frame preamble is provided if configured by the CSI 11. The end of a data frame may occur either by an end of frame indication or by outputting a number of bytes equal to the maximum frame size set by the CSI 11.

FIG. 12 C shows a flow chart of the operations for sending a data frame out a port with an explicit start and end symbols or signal protocol. This protocol separates data frames using signals parallel to those for transferring data or whose occurrence is mutually exclusive to data and marked as non-data information. The end of a data frame may occur either by an end of frame indication or by outputting a number of bytes equal to the maximum frame size set by the CSI 11.

Figure 12D:
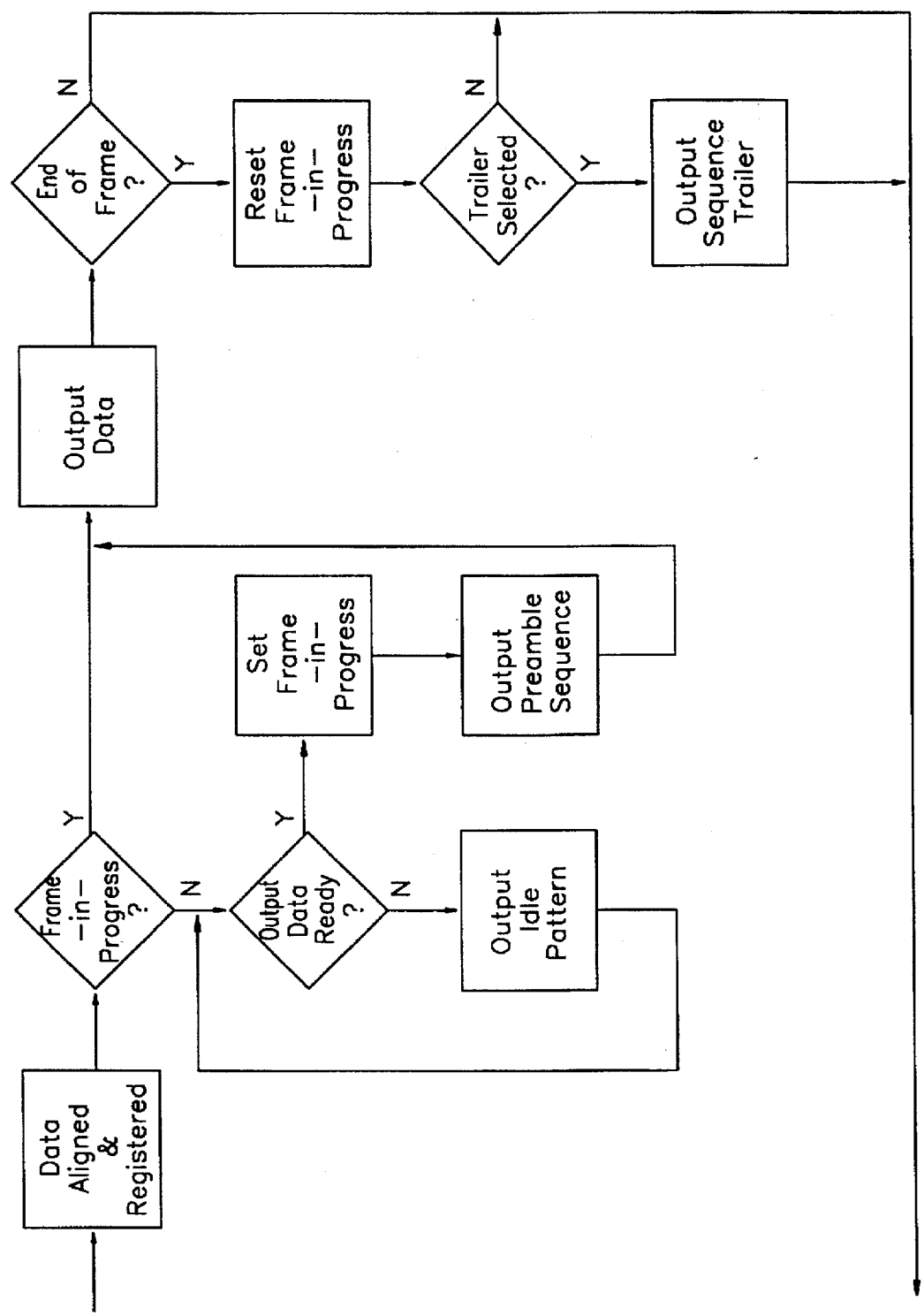
FIG. 12D shows a flow chart for identification and buffering an output data frame using an embedded preamble sequence link protocol.

FIG. 12D shows a flow chart of the operations for sending a data frame out a port with embedded preamble protocol. This protocol separates data frames using a previously defined preamble sequence, as well as idle patterns when no data is ready to be output. The end of a data frame may occur either by the indication provided by the FIFO buffer entry tags or by outputting a number of bytes equal to the maximum frame size set by the CSI 11.

While the invention has been shown and described using the exemplary scenario, it will be understood by those skilled in the art that this is not the only possible form. Indeed, various changes in form and details may be made herein without changing the scope and spirit of the invention.

The embodiments of the invention in which an exclusive property or right is claimed are defined as follows:

1. A compact, adaptable brouting (CAB) switch for communication between multiple external systems comprising:
   a central shared memory device which stores communication management data and information data wherein the communication management data is appended at the end of the information data to form a data frame;
   a central processing device connected to the central shared memory device to control the movement of the information data within the CAB switch;
   a plurality of switch ports, connected to the central shared memory device, to receive information data from external systems with the same or differing protocols and to transfer the information data to the external systems wherein the switch ports each comprise external interfaces connecting the external systems with the switch ports, data steering logic connected to the external interfaces to control the movement of the data frame in the switch port, a local memory connected to the data steering logic to store the data frame in the switch port wherein the switch ports are configured to store a data frame either as a single rotary buffer or as a multiple paged buffer as well as to accept different data sizes and types; and
   a bus device which connects the plurality of switch ports to the central shared memory to transfer the communication management data and information data between the switch ports, and between the switch ports and the central shared memory device.

2. A compact, adaptable brouting (CAB) switch for communication between multiple external systems comprising:
   a central shared memory device which stores communication management data and information data wherein the communication management data is appended at the end of the information data to form a data frame;
   a central processing device connected to the central shared memory device to control the movement of the information data within the CAB switch;
   a plurality of switch ports, connected to the central shared memory device, to receive information data from external systems with the same or differing protocols and to transfer the information data to the external systems wherein the switch ports each comprise external interfaces connecting the external systems with the switch ports, data steering logic connected to the external interfaces to control the movement of the data frame in the switch port, and a local memory connected to the data steering logic to store the data frame in the switch port wherein the switch ports have the capability to autonomously store and retrieve a data frame from the central shared memory device without interrupting the single central processing device so that the single central processing device can operate on accumulated data frames without need for immediate processing of new information data when new information data has been received and to be configured to accept different data sizes and types; and
   a bus device which connects the plurality of switch ports to the central shared memory to transfer the communication management data and information data between the switch ports, and between the switch ports and the central shared memory device.

3. A compact, adaptable brouting (CAB) switch for communication between multiple external systems comprising:
   a central shared memory device which stores communication management data and information data wherein the communication management data is appended at the end of the information data to form a data frame;
   a central processing device connected to the central shared memory device to control the movement of the information data within the CAB switch;
   a plurality of switch ports, connected to the central shared memory device, to receive information data from external systems with the same or differing protocols and to transfer the information data to the external systems wherein the switch ports each comprise external interfaces connecting the external systems with the switch ports, data steering logic connected to the external interfaces to control the movement of the data frame in the switch port, a local memory connected to the data steering logic to store the data frame in the switch port wherein the switch ports have the capability to be configured for routing locally among the external input and output interfaces connected to each switch port such that information data is routed without the information data ever being stored in the central shared memory device as well as accepting different data sizes and types; and
   a bus device which connects the plurality of switch ports to the central shared memory to transfer the communication management data and information data between the switch ports, and between the switch ports and the central shared memory device.

4. A compact, adaptable brouting (CAB) switch for communication between multiple external systems comprising:
   a central shared memory device which stores communication management data and information data wherein the communication management data is appended at the end of the information data to form a data frame;
   a central processing device connected to the central shared memory device to control the movement of the information data within the CAB switch;
   a plurality of switch ports, connected to the central shared memory device, to receive information data from external systems with the same or differing protocols and to transfer the information data to the external systems wherein the switch ports each comprise external interfaces connecting the external systems with the switch ports, data steering logic connected to the external interfaces to control the movement of the data frame in the switch port, a local memory connected to the data steering logic to store the data frame in the switch port wherein the switch ports have the capability to be configured to accept different data sizes and types and a master/slave relationship exists with a switch port designated as a master switch port and other switch ports designated as slave switch ports wherein the slave switch ports are configured to communicate information data with a specific external system which is designated by a descriptor wherein the slave switch ports check the master switch port to determine if there is a match in descriptors in which if a match exists, a slave switch port then receives the same information data at the same time as the master switch port so multiple slave switch ports can receive the same information data received by the master switch port; and a bus device which connects the plurality of switch ports to the central shared memory to transfer the communication management data and information data between the switch ports, and between the switch ports and the central shared memory device.

5. The CAB switch of claim 4 wherein the slave switch ports operate without interrupting the single central processing device.

6. A compact, adaptable brouting (CAB) switch for communication between multiple external systems comprising:

a plurality of switch ports to receive data from external systems with the same or differing protocols and to transfer the data to the external systems wherein the switch ports further comprise external interfaces connecting the external systems with the switch ports, data steering logic connected to the external interfaces to control the movement of data in the switch port, and a local memory connected to the data steering logic to store data in the switch port wherein the switch ports are configured to store data either as a single rotary buffer or as a multiple paged buffer as well as to accept different data sizes and types;

a central shared memory device connected to the plurality of switch ports to store data;

a bus device which connects the plurality of switch ports to the central shared memory device to transfer data between the switch ports, and between the switch ports and the central shared memory device; and a central processing device connected to the central shared memory device to control the movement of data within the CAB switch.

7. A compact, adaptable brouting (CAB) switch for communication between multiple external systems comprising:

a plurality of switch ports to receive data from external systems with the same or differing protocols and to transfer the data to the external systems wherein the switch ports further comprise external interfaces connecting the external systems with the switch ports, data steering logic connected to the external interfaces to control the movement of data in the switch port, and a local memory connected to the data steering logic to store data in the switch port and to be configured to accept different data sizes and types;

a central shared memory device connected to the plurality of switch ports to store data;

a bus device which connects the plurality of switch ports to the central shared memory device to transfer data between the switch ports, and between the switch ports and the central shared memory device; and a central processing device connected to the central shared memory device to control the movement of data within the CAB switch wherein the switch ports have the capability to autonomously store and retrieve data from the central shared memory device without interrupting the single central processing device so that the single central processing device can operate on accumulated data without need for immediate processing of new data when new data has been received.

8. A compact, adaptable brouting (CAB) switch for communication between multiple external systems comprising:

a central shared memory device which stores communication management data and information data wherein the communication management data is appended at the end of the information data to form a data frame;

a central processing device connected to the central shared memory device to control the movement of the information data within the CAB switch;

a plurality of switch ports, connected to the central shared memory device, to receive information data from external systems with the same or differing protocols and to transfer the information data to the external systems wherein the switch ports each comprise external interfaces connecting the external systems with the switch ports, data steering logic connected to the external interfaces to control the movement of the data frame in the switch port, a local memory connected to the data steering logic to store the data frame in the switch port wherein the switch ports have the capability to be configured to accept different data sizes and types and to autonomously store and retrieve a data frame from the local memory without interrupting the single central processing device so that the single central processing device can operate on accumulated data frames without need for immediate processing of new information data when new information data has been received; and a bus device which connects the plurality of switch ports to the central shared memory device to transfer the communication management data and information data between the switch ports, and between the switch ports and the central shared memory device.

9. A compact, adaptable brouting (CAB) switch for communication between multiple external systems comprising:

a central shared memory device which stores communication management data and information data wherein the communication management data is appended at the end of the information data to form a data frame;

a central processing device connected to the central shared memory device to control the movement of the information data within the CAB switch;

a plurality of switch ports, connected to the central shared memory device, to receive information data from external systems with the same or differing protocols and to transfer the information data to the external systems wherein the switch ports each comprise external interfaces connecting the external systems with the switch ports, data steering logic connected to the external interfaces to control the movement of the data frame in the switch port, a local memory connected to the data steering logic to store the data frame in the switch port wherein the switch ports have the capability to be configured to accept different data sizes and types and for routing locally among the external input and output interfaces connected to each switch port such that information data is routed without the information data ever being stored in the local memory; and a bus device which connects the plurality of switch ports to the central shared memory device to transfer the communication management data and information data between the switch ports, and between the switch ports and the central shared memory device.

10. A compact, adaptable brouting (CAB) switch for communication between multiple external systems comprising:

a plurality of switch ports to receive data from external systems with the same or differing protocols and to transfer the data to the external systems wherein the switch ports further comprise external interfaces connecting the external systems with the switch ports, data steering logic connected to the external interfaces to control the movement of data in the switch port, and a local memory connected to the data steering logic to store data in the switch port and to be configured to accept different data sizes and types;

a central shared memory device connected to the plurality of switch ports to store data;

a bus device which connects the plurality of switch ports to the central shared memory device to transfer data between the switch ports, and between the switch ports and the central shared memory device; and a central processing device connected to the central shared memory to control the movement of data within the CAB switch wherein the switch ports have the capability to autonomously store and retrieve data from the local memory without interrupting the central processing device so that the central processing device can operate on accumulated data without need for immediate processing of new data when new data has been received.

* * * * *